(12) United States Patent
Collin

(10) Patent No.: US 11,722,650 B2
(45) Date of Patent: Aug. 8, 2023

(54) DISPLAY DEVICE AND SYSTEM

(71) Applicant: Envisics Ltd, Milton Keynes (GB)

(72) Inventor: Stig Mikael Collin, Milton Keynes (GB)

(73) Assignee: ENVISICS LTD, Milton Keynes (GB)

( * ) Notice: Subject to any disclaimer, the term of this patent is extended or adjusted under 35 U.S.C. 154(b) by 0 days.

(21) Appl. No.: 17/246,476

(22) Filed: Apr. 30, 2021

(65) Prior Publication Data

US 2021/0385421 A1 Dec. 9, 2021

(30) Foreign Application Priority Data

Jun. 4, 2020 (GB) .................................. 2008397

(51) Int. Cl.
*H04N 9/31* (2006.01)
*G03H 1/22* (2006.01)

(52) U.S. Cl.
CPC ......... *H04N 9/3179* (2013.01); *G03H 1/2205* (2013.01); *G03H 1/2294* (2013.01); *G03H 2001/2231* (2013.01); *G03H 2225/22* (2013.01); *G03H 2225/52* (2013.01)

(58) Field of Classification Search
None
See application file for complete search history.

(56) References Cited

U.S. PATENT DOCUMENTS

| | | | |
|---|---|---|---|
| 8,948,248 B2 | 2/2015 | Rossato et al. | |
| 10,061,268 B2 * | 8/2018 | Christmas | B60Q 1/16 |
| 11,054,643 B2 * | 7/2021 | Christmas | G06T 11/60 |
| 11,231,583 B2 * | 1/2022 | Christmas | G02B 5/30 |
| 2003/0160980 A1 | 8/2003 | Olsson et al. | |
| 2008/0175477 A1 * | 7/2008 | Ohk | G06T 7/11 382/176 |
| 2009/0087118 A1 | 4/2009 | Yamamoto | |
| 2010/0214306 A1 | 8/2010 | Kim | |
| 2011/0241677 A1 * | 10/2011 | Busse | G01R 33/56308 324/309 |
| 2012/0002854 A1 * | 1/2012 | Khare | G06T 11/006 382/284 |

(Continued)

FOREIGN PATENT DOCUMENTS

| KR | 10-2017-0082865 | 7/2017 |
|---|---|---|
| TW | 201127021 A | 8/2011 |

(Continued)

OTHER PUBLICATIONS

Combined Search and Examination Report under Section 17 and 18(3) for GB Application No. GB2008397.8 dated Nov. 10, 2020, pp. 1-6.

(Continued)

*Primary Examiner* — Reza Aghevli
(74) *Attorney, Agent, or Firm* — McDonnell Boehnen Hulbert & Berghoff LLP

(57) ABSTRACT

An image processing engine and method of forming a hologram of a target image for projection using data streaming. An input or primary image is sub-sampled using a kernel and the secondary image output used to generate a hologram of the target image. A technique of kernel sub-sampling using a plurality of two or more data streams provides improvements in efficiency, including reduced data storage requirements and increased processing speed.

21 Claims, 12 Drawing Sheets

(56) References Cited

U.S. PATENT DOCUMENTS

| | | | |
|---|---|---|---|
| 2012/0314770 A1* | 12/2012 | Kim | H04N 19/132 |
| | | | 375/E7.125 |
| 2013/0250042 A1* | 9/2013 | Raghoebardayal | A63F 13/655 |
| | | | 348/36 |
| 2020/0103670 A1* | 4/2020 | Cole | G03H 1/2294 |
| 2021/0055549 A1* | 2/2021 | Chang | G02B 27/0103 |
| 2021/0084270 A1* | 3/2021 | Christmas | G03H 1/28 |
| 2021/0165212 A1* | 6/2021 | Christmas | G02B 27/0081 |
| 2021/0195146 A1* | 6/2021 | Christmas | G03H 1/0808 |
| 2021/0373332 A1* | 12/2021 | Collin | G09G 3/346 |
| 2022/0043153 A1* | 2/2022 | Smeeton | G03H 1/2294 |

FOREIGN PATENT DOCUMENTS

| | | |
|---|---|---|
| TW | I618398 B | 3/2018 |
| TW | 201946031 A | 12/2019 |
| WO | 2011127080 A1 | 10/2011 |

OTHER PUBLICATIONS

S. Zhong et al., "Implementation of large kernel 2-D convolution in limited FPGA resource," Proc. SPIE 6789, MIPPR 2007: Medical Imaging, Parallel Processing of Images, and Optimization Techniques, 67892N (Nov. 14, 2007).

\* cited by examiner

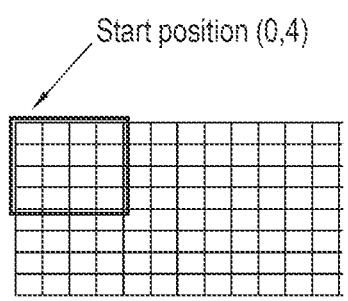
FIG. 4A
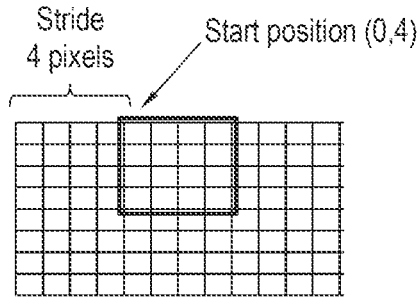
FIG. 4B
FIG. 5A
FIG. 5B

DISPLAY DEVICE AND SYSTEM

CROSS-REFERENCE TO RELATED APPLICATIONS

The present application is a non-provisional patent application claiming priority to United Kingdom Patent Application No. 2008397.8, filed Jun. 4, 2020, the contents of which are hereby incorporated by reference in their entirety.

FIELD

The present disclosure relates to an image processor and method for processing images for holographic projection. The present disclosure further relates to a holographic projector, a holographic projection system, a method of holographically projecting an image and a method of holographically projecting video images. Some embodiments relate to a head-up display and a light detection and ranging system.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is disclosed an image processing engine and method of forming a hologram of a target image for projection using data streaming. In particular, as described in more detail below, an input or primary image, which may be an upscaled and/or modified version of a target image, may be sub-sampled using a kernel, and the secondary image may be output and used to generate a hologram of the target image. As described herein, a technique of kernel sub-sampling using a plurality of two or more data streams provides improvements in efficiency, including reduced data storage requirements (e.g., memory and/or buffer capacity) and increased processing speed.

Conventionally, large areas of data storage are required for storing the entire primary image data for kernel sub-sampling. Random memory access is required to access the primary image data of all pixels needed for each intended kernel operation. Moreover, video speed processing requires at least part of the image data to be buffered, in particular, at least the data entries (image pixel values) necessary to start processing, and at each stage of processing thereafter. The required buffering capacity is therefore dependent on the size of the input data (primary image), not the size of the output data (secondary image).

For holographic image projection, in order to achieve a desired resolution of the image (holographic reconstruction), a target image for projection may be "upscaled" to form a source image having an increased number of pixels. In addition, the source image may be modified to form an intermediate image, for example a so-called "warped image" in order to correct for image distortions (warping) caused by optical components of the optical replay system of the projector as known in the art. The upscaled source image or the intermediate image derived therefrom may be used as the primary image for kernel sub-sampling. Accordingly, the size of the primary image (resolution/number of pixels), and thus the amount of data, may be multiple times the size of the secondary image. In consequence a large amount of data storage and buffering capacity is required for kernel sub-sampling the primary image to produce the secondary image.

In accordance with the present disclosure, data streaming is used to reduce the amount of data storage and buffering capacity used to sub-sample a primary image using a kernel to determine an output image for hologram calculation.

A first data stream of pixel values of the primary image may be synchronised with a second data stream of kernel values of the kernel, so that each pixel value is paired with the corresponding kernel value for the kernel operation at the plurality of kernel sampling positions. The kernel values are repeated within the second data stream for each kernel sampling position. Accordingly, there is a one-to-many correlation between the pixel values of the primary image in the first data stream and the kernel values of the second data stream. in addition, each row of kernel values of the kernel in the second data stream is paired with a plurality of rows of image pixels of the primary image in the first data stream.

In some embodiments, a data streaming engine is configured to perform a data streaming procedure. In particular, the data streaming engine may form the first data stream by reading the pixel value of the pixels of the primary image row by row. For example, the pixel values may be read pixel by pixel in raster scan order. At the same time, the data streaming engine may form the second data stream of kernel values of the kernel having m rows using the steps: (i) repeatedly reading the kernel values of a first row of the kernel the plurality of times; (ii) repeatedly reading the kernel values of a next row of the kernel the plurality of times; (iii) iteratively repeating step (ii) (m−2) times; (iv) returning to step (i), and (v) stopping steps (i) to (iv) when there are no more pixel values in the first data stream. A clock counter may be used to synchronize the values in the first and second data streams.

In some embodiments, the image processing engine is configured to perform a kernel operation and buffering procedure. In particular, the kernel operation is performed at a plurality of kernel sampling position. For each row of pixels of the primary image, the kernel operation processes the synchronised pairs of values of the first and second data streams associated with the kernel sampling positions, to derive respective accumulated (partial) pixel values for output to a buffer. The buffering procedure is performed by storing the accumulated (partial) pixel values in consecutive positions in a buffer. The accumulated (partial) pixel values output to the buffer from processing one row of pixels of the primary image may form a third data stream provided as feedback for processing the next row of pixels of the primary image to derive updated accumulated (partial) pixel values. The feedback process may be repeated, row by row, until the last row of pixels of the primary image has been processed for the same plurality of kernel sampling positions (i.e. in the same row or line of kernel sampling positions). The accumulated pixel values output to the buffer are then full or complete pixel values of a row of the secondary image. Accordingly, rows of pixels of the secondary image may be generated and output row by row. Advantageously, the rows of pixels of the secondary image may be streamed in real time to a hologram engine for calculating a hologram corresponding to the secondary image. Thus, it is possible to begin hologram calculation before all the pixels of the secondary image have been derived.

In some examples, the kernel having m rows and n columns is moved in a raster scan path, in which the stride in the x direction is n pixels and the stride in the y direction is m pixels. Thus, the kernel window sub-samples contiguous arrays of m×n pixels of the primary image. In these examples, the first data stream may be formed by reading the pixel values of the primary image pixel by pixel in raster scan order. This simplifies the data streaming procedure for forming the first data stream.

In implementations, data streaming may allow the determination of a secondary image from the primary image and determination of a corresponding hologram to be performed concurrently, thereby increasing processing speed. In particular, pixels values determined for the secondary image may be streamed to a hologram engine in real time, as described further below. Increased processing speed makes it possible to display a greater number of holograms for an image (i.e. using a greater number of secondary images or sub-frames) in a video stream. By displaying a greater number of images within the integration time of the human eye, the quality of the holographic reconstruction (holographic image) seen by the viewer is improved.

In some implementations, multiple secondary images may be determined by sub-sampling the same source image using different sub-sampling schemes. For example, a plurality of different kernels and/or kernel sampling positions may be used to determine a plurality of different secondary images. The plurality of different secondary images may be used to generate a corresponding plurality of holograms for projecting the target image. For example, the plurality of different holograms may be displayed sequentially on a spatial light modulator, within the integration time of the human eye, and the spatial light modulator may be illuminated to form a sequence of holographic reconstructions at the replay plane for projection and viewing. It is found that the display of multiple different holograms representing the same target image for projection can lead to improved quality of the image seen by the viewer.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$)

which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "target image" is used herein to refer to the desired image for projection. That is, the target image is the image that the holographic system is required to project onto a holographic replay plane. The target image may be a still image or one image (or image frame) of a sequence of images such as a video-rate sequence of images.

The term "source image" is used herein to refer to an image derived from the target image. The source image may be the same as the target image or the source image may be a high-resolution version or an upscaled version of the target image. In particular, the source image may be an upscaled version of the target image so as to increase its resolution (in terms of number of pixels). That is, the source image may comprise more pixels than the target image. Any upscaling technique may be employed. In some embodiments, upscaling comprises repeating pixel values of the target image, as described in the detailed description. In these embodiments, the computational engine for upscaling the target image may use a simple mapping scheme to represent the repeating.

In addition, the source image may be modified, for example to account for distortions caused by optical components of the holographic projector. In this case, the source image is an "intermediate image" derived from the source image. In the description of embodiments, the term "intermediate image" is used herein to refer to an image derived from the source image, for example in accordance with a warping map.

The term "primary image" is used herein to refer to the image that is sub-sampled as described herein. The primary image may be either (1) the source image or (2) an intermediate image derived from the source image.

The term "secondary image" is used herein to refer to an image derived from the primary image. As described herein, a plurality of secondary images may be derived from an individual primage image. Each secondary image is formed by sub-sampling (also referred to as "under-sampling") the primary image. Each secondary image comprises fewer pixels than the source image. Each pixel value of the secondary image may be calculated from several pixel values (e.g. a group or array of pixels) of the primary image, optionally, using a weighting technique as described in the detailed description. Notably, the upscaling process used to form the source image from the target image is different to the sub-sampling technique used to form each secondary image from the primary image. The secondary images are each different to the primary image but, optionally, they may have the same number of pixels. A hologram corresponding to each secondary image is calculated.

The term "output image" is also used herein to refer to a "secondary image" derived by sub-sampling the primary image, since it is output from an image processing engine to a hologram engine for calculating the hologram using an appropriate algorithm as described herein. Unless otherwise stated, the terms "target image", "primary image" "source image", "intermediate image" and "secondary/output image" are used herein (as shorthand) to refer to image data comprising pixel values (or the like) representing the respective images.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

Specific embodiments are described by way of example only with reference to the following figures:

FIGS. 4A and 4B show an example technique for sub-sampling a primary image to derive an output image using a 4×4 kernel operating at two successive sampling positions in accordance with embodiments;

FIG. 5A shows a generic kernel, and FIG. 5B shows an example kernel with kernel values or weights, for use in the technique of FIGS. 4A and 4B;

The same reference numbers will be used throughout the drawings to refer to the same or like parts.

DETAILED DESCRIPTION

The present disclosure is not restricted to the embodiments described in the following but extends to the full scope of the appended claims. That is, the present disclosure may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
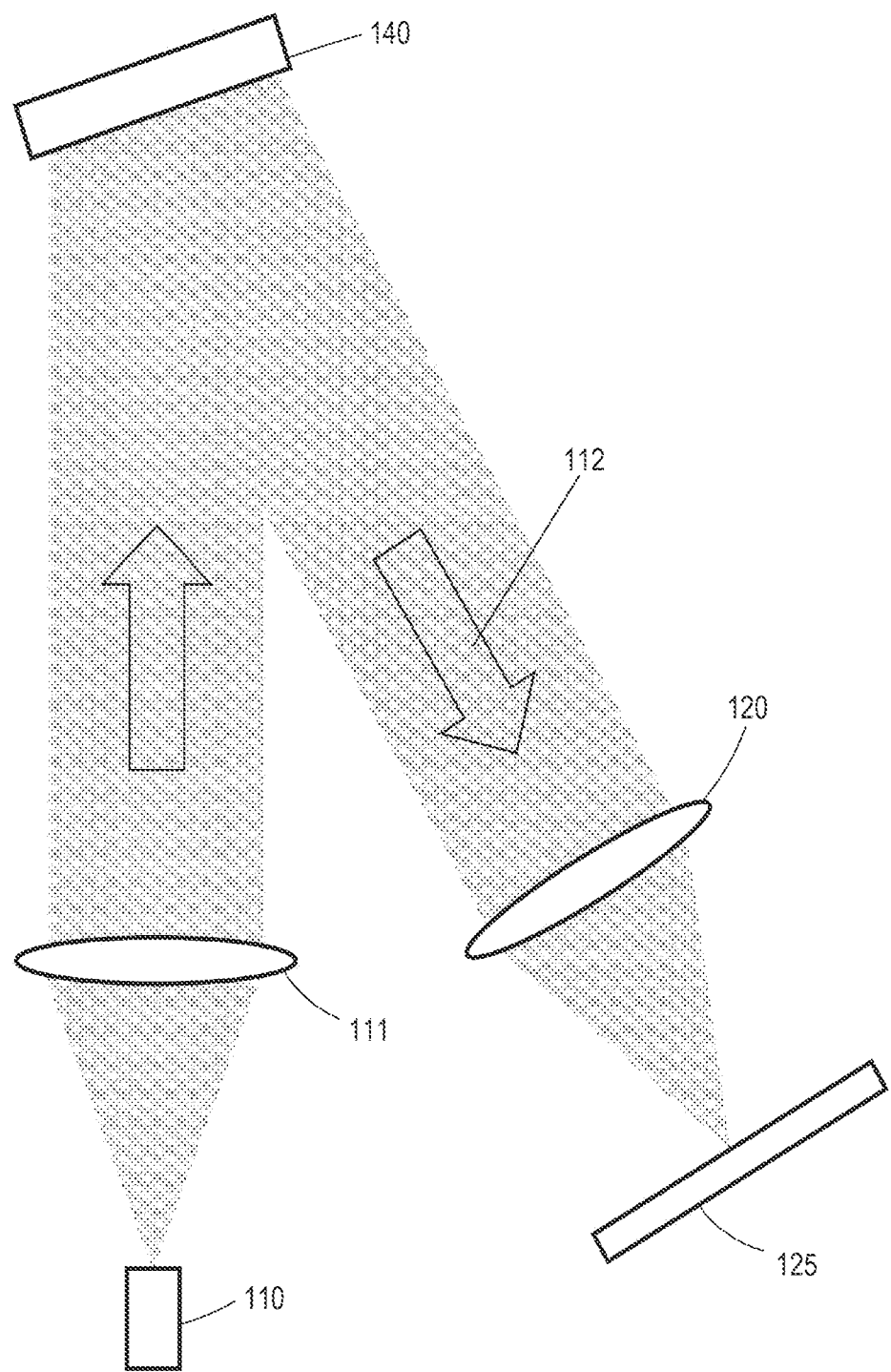
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x,y)$ and $I_B(x,y)$, in the planes A and B respectively, are known and IA(x,y) and IB(x,y) are related by a single Fourier transform. With the given intensity cross-sections, an approximation to the phase distribution in the planes A and B, $\Psi A(x,y)$ and $\Psi B(x,y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x,y) and IB(x,y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
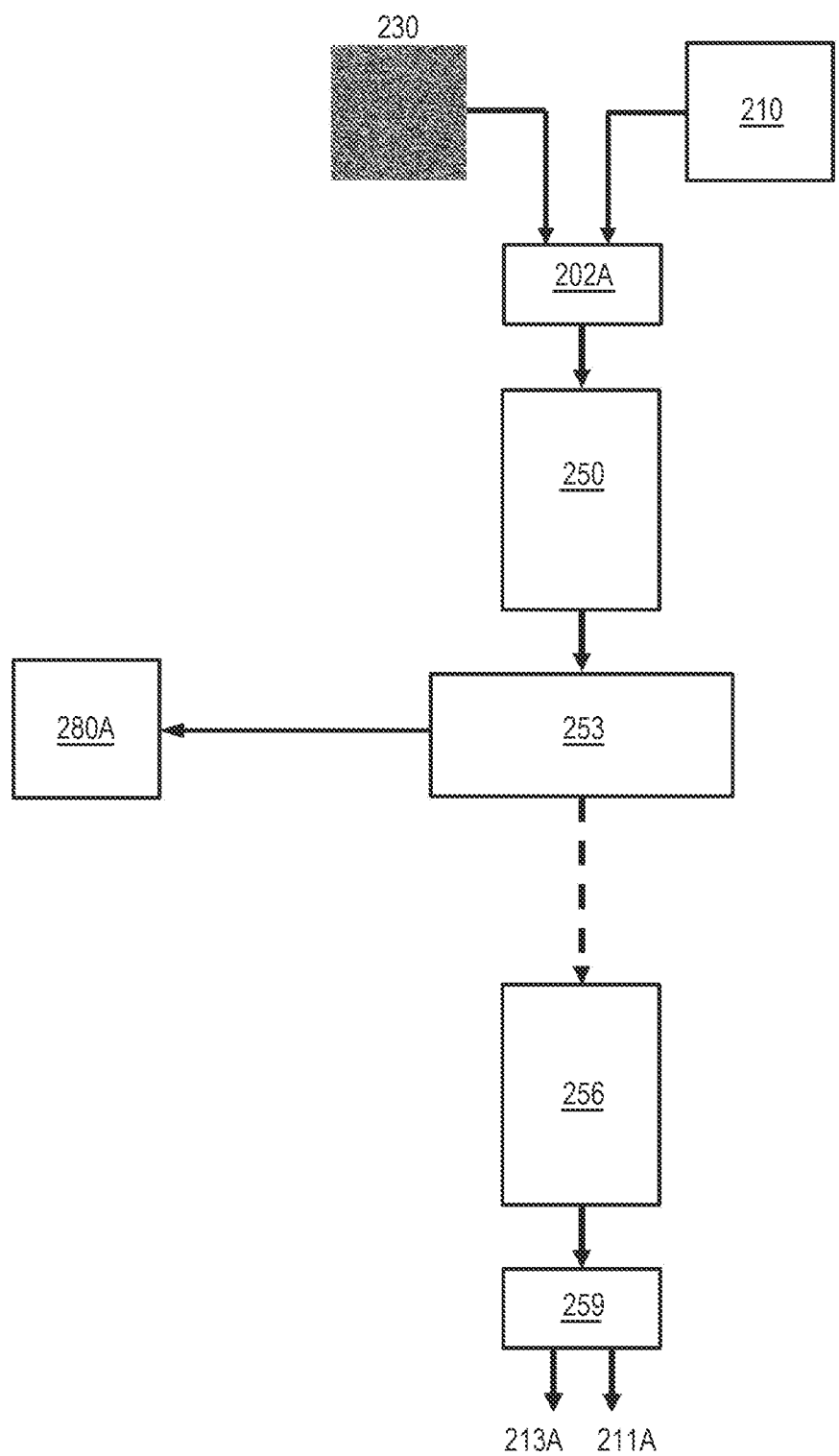
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
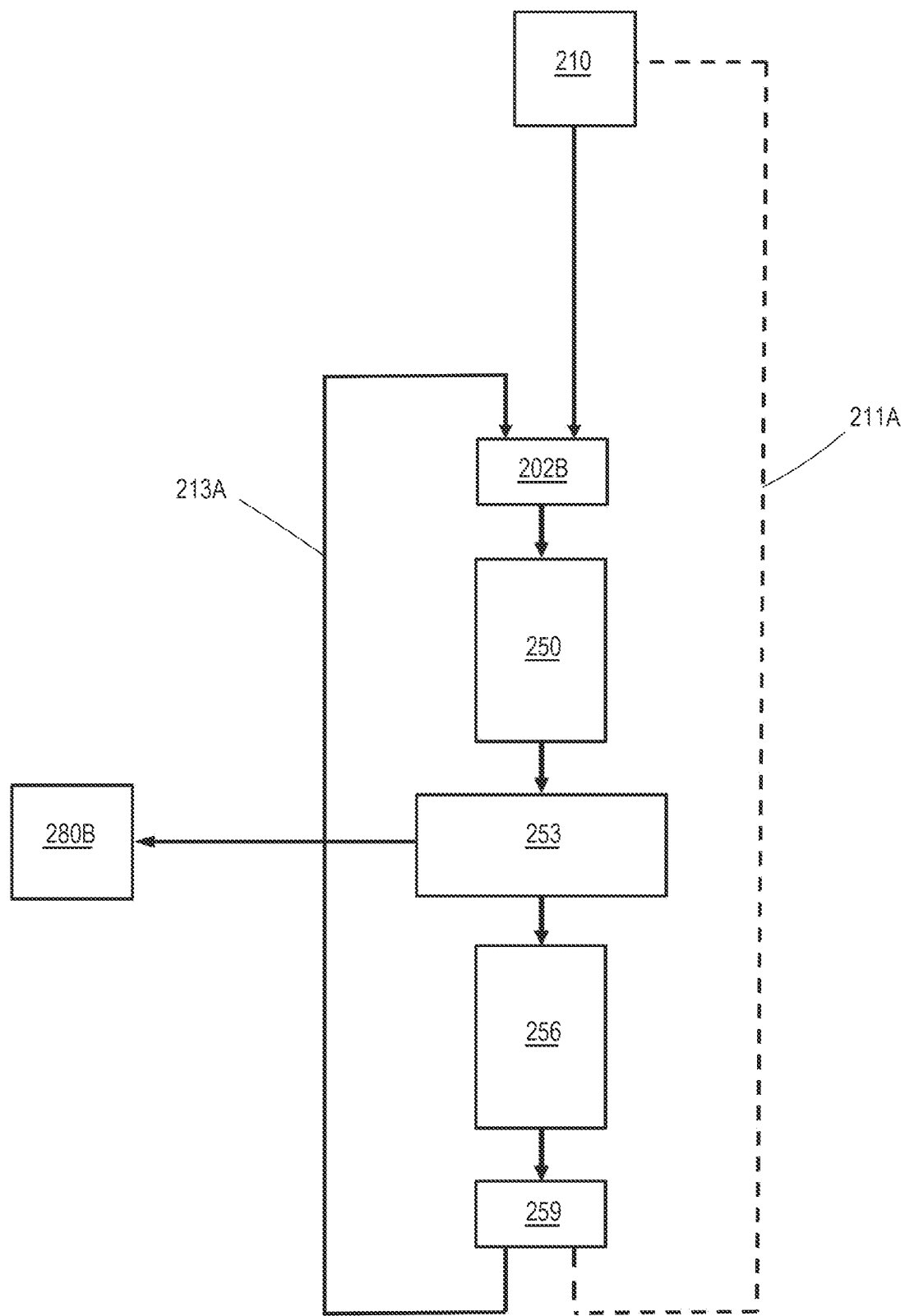
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
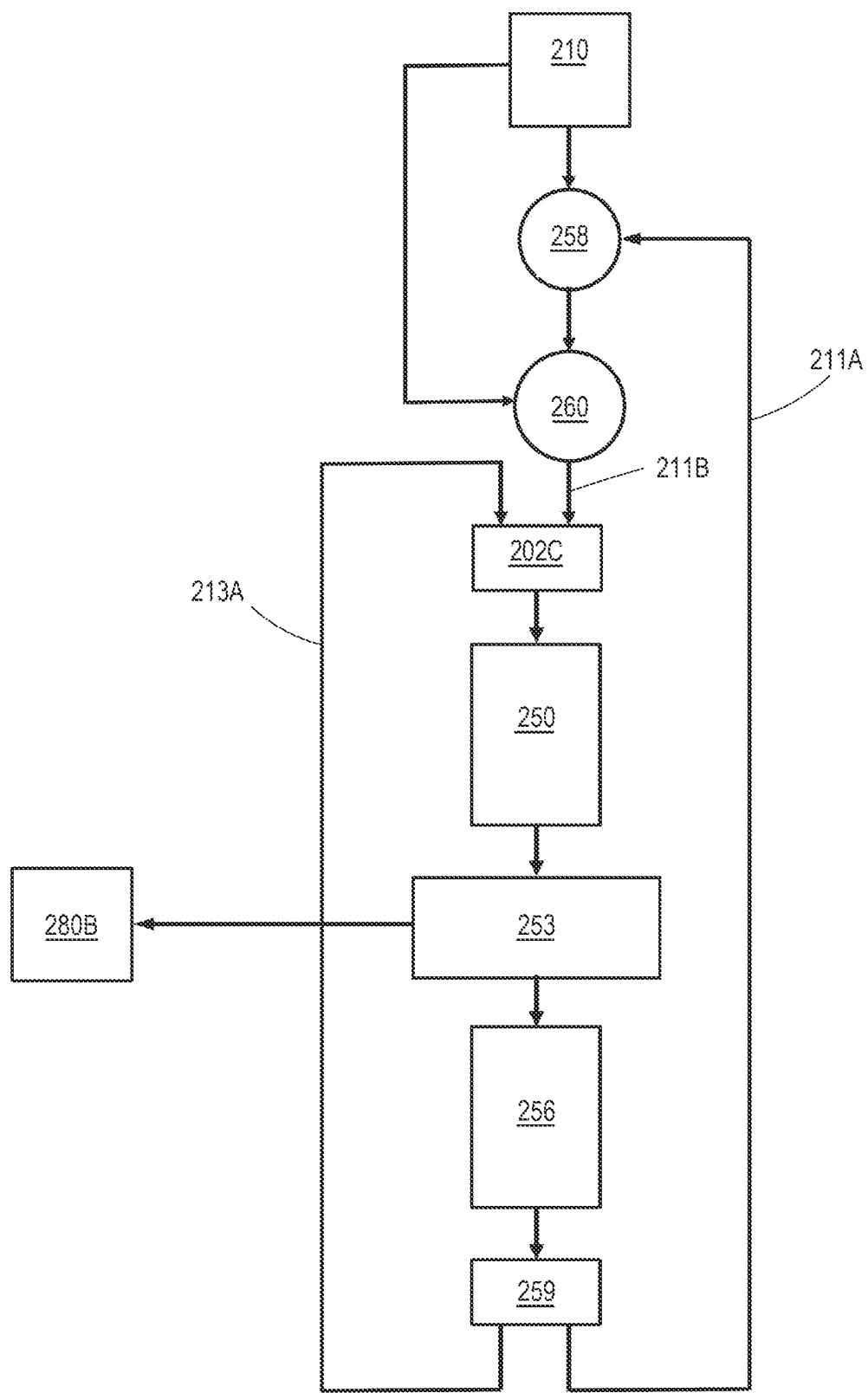
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:
 where:
  F' is the inverse Fourier transform;
  F is the forward Fourier transform;
  R[x, y] is the complex data set output by the third processing block 256;
  T[x, y] is the input or target image;
  ∠ is the phase component;
  Ψ is the phase-only hologram 280B;
  η is the new distribution of magnitude values 211B; and
  α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u,v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
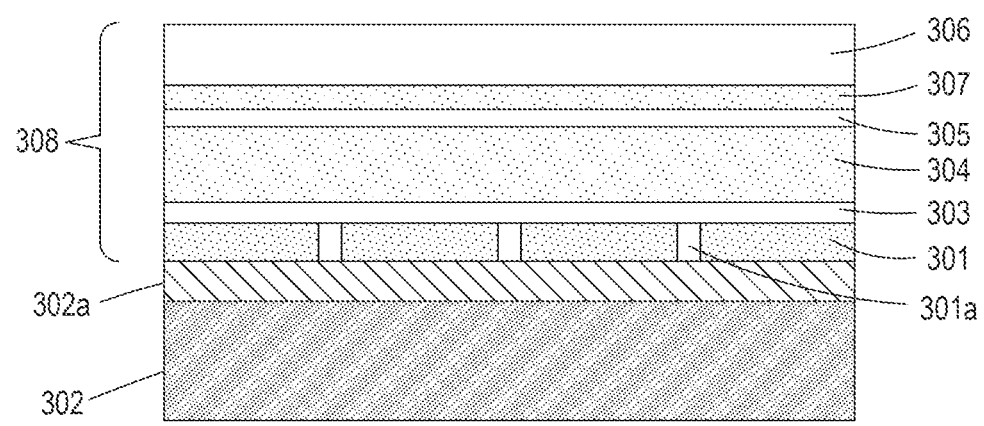
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Subsampling with Kernels

FIGS. 4A, 4B illustrate a technique for deriving a secondary image from a primary image using a "kernel" as illustrated in FIGS. 5A and 5. A kernel may be considered as a moving "sampling window" or "virtual aperture". The kernel operates on a group of pixels of an image that fall within the sampling window to derive a single output (sub-sampled) pixel value representative thereof. Accordingly, the kernel is used to "under-sample" or "sub-sample" pixels of a high-resolution primary image (e.g. source image or intermediate image) to derive one or more secondary images (i.e. output images), so that each secondary image comprises fewer pixels than the primary image.

FIG. 5A shows a generic kernel comprising 4×4 kernel values (also known as "kernel pixels" or "weights") and FIG. 5B shows an example kernel comprising 4×4 kernel values. Each kernel value defines a weighting factor or weight for a pixel value of the primary image at the corresponding position within the sampling window. As shown in FIG. 5A, a kernel value is denoted as Wx, y, where x and y are the respective coordinates of the kernel value within the 4×4 array forming the kernel. In the example kernel of FIG. 5B, a higher weight (i.e. kernel value=3) is given to the pixel values at the centre of the sampling window and lower weights (i.e. kernel value=1) is given to the pixel values at the edges and corners of the sampling window. In the illustrated embodiment, at each sampling position the kernel operates by (i) multiplying each pixel value of a 4×4 array of pixels of the primary image falling within the sampling window with its corresponding kernel value or weight and (ii) determining a normalised (i.e. un-weighted) average of the weighted pixel values (e.g. a mean average calculated by dividing the sum of the weighted pixel values by the sum of the kernel values (i.e. the total kernel weight) to derive a single output value representative of the 4×4 array of pixels of the primary image. In the illustrated example, the total kernel weight=24. Thus, step (ii) may be performed by summing the weighted pixel values of pixels within the sampling window and dividing by 24.

FIG. 5B illustrates a simple example kernel, which defines kernel weights such that the pixels values of inner sampled pixels of the 4×4 pixel array of the primary image (i.e. pixels at the centre of the sampling window) have higher weight than pixel values of outer samples pixels of the primary image. As the skilled person will appreciate, many variations of the values of kernel weights are possible according to application requirements. In addition, any kernel shape and size (arrangement, aspect ratio and number of kernel values/weights) corresponding to the sampling window or virtual aperture may be chosen according to application requirements. For example, the kernel weights can be selected to achieve the optimal antialiasing results.

In accordance with the example technique, the 4×4 kernel is incrementally moved over the primary image to a series of sampling positions (i.e. positions of the sampling window over the primary image or "sampling window positions"), so as to sub-sample a series of contiguous (i.e. adjacent and non-overlapping) 4×4 pixel arrays of the primary image. The plurality of sampling positions are defined so that substantially all of the pixels of the primary image are sub-sampled to derive output values corresponding to sub-sampled pixel values for the whole of the primary image. In embodiments, the sampling positions are defined at spaced at regular pixel intervals or "strides" in the x and y directions on the primary image. It may be said that the kernel incrementally traverses the primary image in pixel intervals or strides in the x and y directions.

Two successive sampling positions of the kernel on a primary image are shown in FIGS. 4A and 4B. In particular, an initial (or first) sampling position or "start position" is shown in FIG. 4A. The sampling position may be defined as the pixel coordinate of the primary image corresponding to the top left corner of the kernel. In the example shown in FIG. 4A, the first sampling position is at pixel coordinate (0, 0) of the primary image. The kernel is incrementally moved across the primary image from left to right according to the stride. In the example technique, the stride is 4 pixels in the x direction and 4 pixels in the y direction, so that the sampling windows formed at each sampling position are contiguous, and so do not overlap, with each other. Thus, the second sampling position is at pixel coordinate (0,4) of the primary image, corresponding to the stride distance of 4 pixels in the x direction as shown in FIG. 4B. As the skilled person will appreciate, subsequent sampling positions will be at pixel coordinates (0,8), (0,12) and so on until it reaches the last pixel values in the first 4 rows of the primary image. When the kernel is moved in a raster scan path, the kernel returns to a sampling position at pixel coordinate (4,0) corresponding to the stride distance of 4 pixels in the y direction. The kernel then continues to traverse over the primary image in strides of 4 pixels in the x direction and 4 pixels in the y direction, so as to sub-sample contiguous 4×4 pixel arrays of the primary image using contiguous sampling windows, until all the pixels of the primary image have been sub-sampled. The output values determined at each sampling position are provided as the pixel values of the sub-sampled output image. Thus, the output secondary image is an under-sampled or sub-sampled version of the primary image, having a reduced number of pixels.

As the skilled person will appreciate, in the above example, the number of pixels of the primary image is reduced by a factor of 16 in the secondary image, since a 4×4 array of 16 pixels of the primary image is represented by 1 (one) pixel of the secondary image. Accordingly, the number of pixels in the primary image has a higher resolution than the desired resolution of the image (holographic reconstruction) projected by the holographic projector. For example, the primary image may have a minimum of 2× the desired resolution, such as 4× or 8× the desired resolution. In this way, a hologram calculated from the secondary image forms a holographic reconstruction with the desired resolution even though the resolution is reduced compared to the high-resolution primary image. In some embodiments, the target image is "over-sampled" or "upscaled" to form the primary image, in order to achieve the desired resolution of the image (holographic reconstruction).

The sampling scheme for sub-sampling a primary image using a kernel to derive a secondary image shown in FIGS. 4A and 4B may be varied by changing one or more of: the series of sampling positions; the stride distance in the x and/or y direction, and the kernel size and/or weights. Thus, it is possible to determine a plurality of secondary images from the same primary image. Holograms corresponding to the plurality of secondary images may be calculated and displayed, in turn, on a spatial light modulator as sub-frames of an image frame (target image) corresponding to the primary image.

For example, the kernel shown in FIG. 5B may be used to derive a first secondary image using the series of sampling positions having a stride of 4 pixels in the x direction and 4 pixels in the y direction, as described above with reference of FIGS. 4A and 4B. The same kernel may be used to derive a second secondary image using a series of sampling positions having the same stride of 4 pixels in the x and y directions but with a different initial (or first) sampling position or "start position", such as coordinate (1, 1). In other examples, the stride in the x and/or y directions may be changed.

In yet further examples, the kernel shown in FIG. 5B may be used to derive a first secondary image using the series of sampling positions having a stride of 4 pixels in the x direction and 4 pixels in the y direction, as described above with reference of FIGS. 4A and 4B. A different kernel, for example a 4×4 kernel having different kernel values or weights, may be used to derive a second secondary image using the same series of sampling positions. In other examples, the size of the kernel as well as the kernel values or weights may be changed (e.g. 5×5 kernel with similar or different weights).

Any suitable combination of the above example sampling schemes may be used to derive a plurality of secondary images from the same primary image. As the skilled person will appreciate, the total number of pixels of each secondary image derived from the same primary image may vary. In particular, the number of pixels of each secondary image corresponds to the number of sampling positions used in the respective sub-sampling scheme used. Thus, schemes having fewer sampling positions will lead to secondary images with fewer pixels. In some examples, each secondary image determined from the same primary image has the same number of pixels.

Thus, a plurality of secondary images representing an image for projection may be generated by sub-sampling a primary image using a sampling scheme (kernel comprising a 4×4 array of kernel values). Each secondary image comprises fewer pixels than the primary image. A hologram is determined for each of the plurality of secondary images, and each hologram is displayed, in turn, on a display device to form a holographic reconstruction corresponding to each secondary image on a replay plane. In embodiments, each of the plurality of holograms corresponding to a secondary image is displayed, in turn, on the display device within the integration time of the human eye, so that the holographic reconstructions thereof on the replay plane appear as a single high quality reconstruction of the target image.

Data Streaming

As described above, in order to sub-sample a primary image using a kernel, it is necessary to store pixel data corresponding to a two-dimensional array of pixels of the primary image, and to buffer at least the pixel data entries (i.e. pixel values) of the primary image required for a kernel operation at a particular sampling position (e.g. 4×4 pixel array data) at a corresponding point in time. Thus, the system requires a large amount of data storage and/or capacity to accommodate the pixel data of the relatively high-resolution primary image.

Accordingly, the present disclosure proposes a novel scheme to implement sub-sampling of a primary image by means of a kernel at a series of sampling positions to determine a secondary image. The novel scheme allows the storage and/or buffering capacity requirement to be reduced. In some implementations, the processing speed for determining a hologram corresponding to a secondary image is increased.

Figure 6:
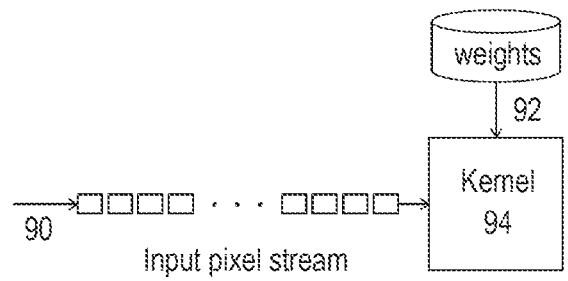
FIG. 6 schematically illustrates a method of data streaming pixel data of a primary image for sub-sampling using a kernel in accordance with embodiments.

The novel scheme is based on data streaming. In particular, the scheme involves forming a first data stream of pixel values of the primary image and a second data stream of kernel values of the kernel. The data streaming is performed in order (i.e. pixel by pixel of image/kernel pixels) row by row. In particular, pixel values of the first row of pixels of the primary image are streamed first, followed by pixel values of the second row of pixels of the primary image and so on up to the pixel values of the last row of pixels of the primary image, at which stage the first data stream ends. In addition, kernel values of the first row of the kernel are streamed first, followed by kernel values of the second row of the kernel and so on up to kernel values of the last row of the kernel; the data streaming sequence is then repeated iteratively, by streaming kernel values of the first row of the kernel, followed by pixel values of the second row of the kernel and so on. The number of pixel values of the first data stream corresponds to the number of kernel values of the second data stream. In particular, each pixel value of the first data stream is paired with a corresponding kernel value of the second data stream, to enable determination of a corresponding weighted pixel value. This is achieved by synchronising pixel values of pixels of the primary image in the first data stream with corresponding kernel values of the kernel in the second data stream. As the skilled person will appreciate, in the illustrated example, the kernel traverses the primary image from left to right (i.e. in the x direction), since the kernel moves in a raster scan path. Thus, for a particular row of pixels of the primary image, the same row of kernel values is used to weight the corresponding pixel values, with the row of kernel values repeated for each sampling position. By sequentially streaming the pixel values of the pixels of the primary image, and the corresponding kernel values or weights of the kernel, in row by row fashion, processing can be performed on a single data stream of pixel values corresponding to a one dimensional array of pixels, instead of pixel values of a two dimensional array of pixels as in the prior art. FIG. 6 schematically illustrates this process of forming the first data stream of pixel values and the second data stream of kernel values or weights that are input to a so-called "base line streaming frame kernel" (or simply "frame kernel") for performing kernel operations as described below.

Figure 11:
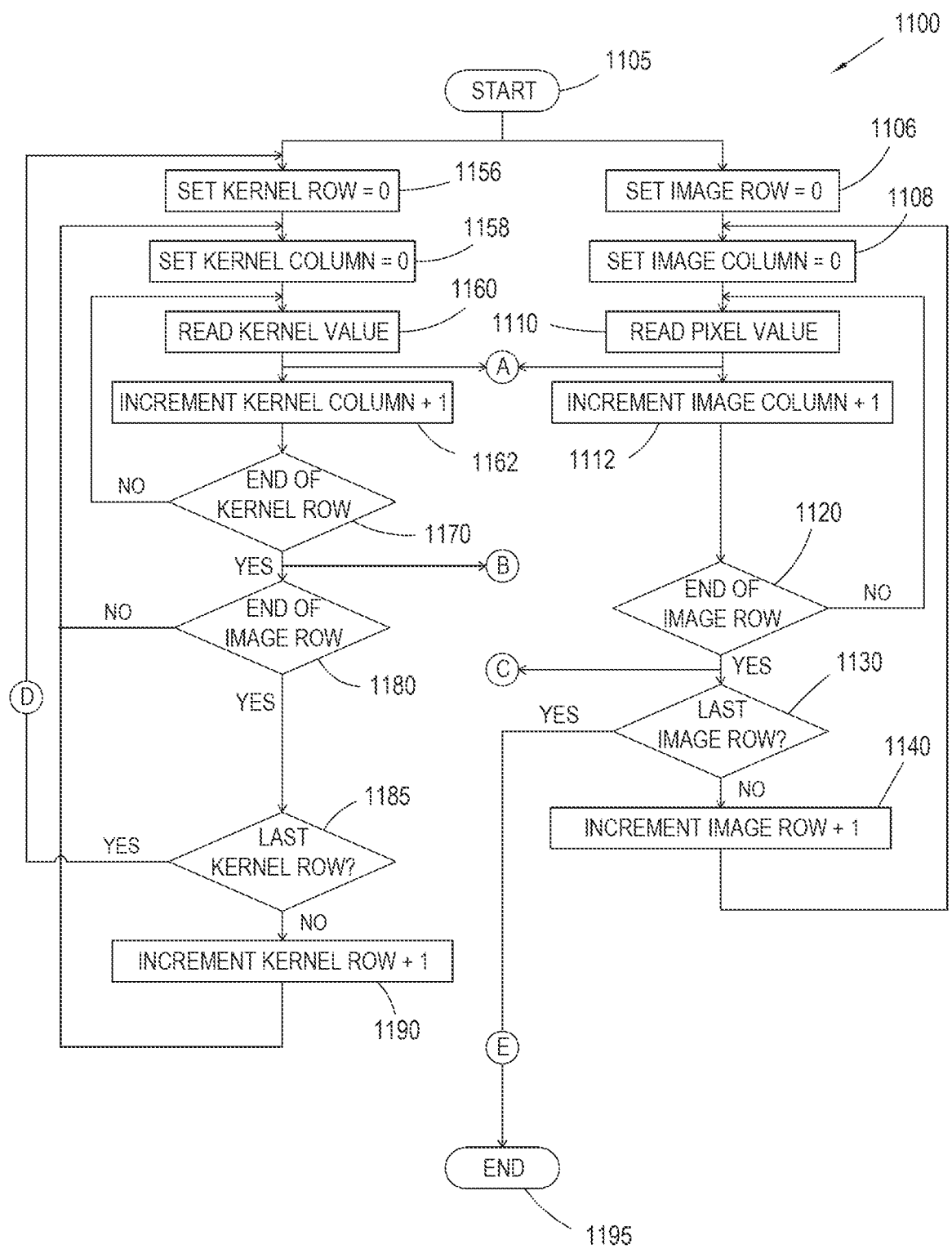
FIG. 11 shows a flowchart of a data streaming procedure, in which a data stream of pixel values is synchronised with a data stream of kernel values, for a kernel sub-sampling procedure in accordance with embodiments.

FIG. 11 is a flowchart illustrating a method 1100 of data streaming for use in sub-sampling a primary image using a kernel in accordance with some embodiments. The method 1100 receives an input image corresponding to a primary image comprising pixel data of an array of pixels of the primary image for sub-sampling to determine a secondary image as described herein. The method 1100 further receives a kernel comprising an array of kernel values or weights as described herein. In the illustrated example, the kernel comprises an array of M rows and N columns of kernel values and thus forms a sampling window of an array of M×N pixels. In addition, a series of sampling positions of the kernel are defined. In the illustrated example, the stride in the x direction is N pixels and the stride in the y direction is M pixels so that the series of sampling positions sub-sample contiguous arrays of M×N pixels of the primary image, as in the example of FIGS. 4A and 4B described above. This has the advantage that each of the pixel values of the primary image is sub-sampled just once, meaning that the pixel data of the primary image may be streamed in raster scan order, as described below. As the skilled person will appreciate, it is possible to vary the stride in each of the x and y directions in order to change the series of sampling positions according to applications requirements. For example, the stride may be N/2 in the x direction and M/2 in the y direction.

The method 1100 of FIG. 11 forms a first data stream of pixel values and a second data stream of kernel values, wherein the first and second data streams are formed concurrently so that each pixel value in the first data stream is synchronised in time, and thus paired, with a corresponding kernel value in the second data stream.

The method starts at step 1105 in response to receiving the primary image and the kernel information for use in sub-sampling a primary image using the kernel in accordance with embodiments.

Step 1106 sets a row counter of the image to 0 (zero), and step 1108 set a column counter of the image to 0 (zero). Step 1110 reads the pixel value of primary image at the row and column position indicated by the image row and column counters (i.e. the pixel value at coordinate (0, 0)), corresponding to the initial sampling position. Step 1112 increments the image column counter by 1. The pixel value read in step 1110 is output at "A" as the first (next) pixel value of the first data stream. In addition, step 1156 sets a row counter of the kernel to 0 (zero) and step 1158 set a column counter of the kernel to 0 (zero). Step 1160 reads the kernel value of kernel at the row and column position indicated by the kernel row and column counters (i.e. the kernel value at coordinate (0, 0)), and step 1162 increments the kernel column counter by 1. The kernel value read in step 1160 is output at "A" as the first (next) kernel value of the second data stream. Steps 1106, 1108 and 1110 are performed concurrently with steps 1156, 1158 and 1160, and the output of the data values to the first and second data streams at "A" is synchronised. In particular, the pixel value and the corresponding kernel value are output at "A" at the same time (i.e. in the same clock cycle). Thus, the pixel values in the first data stream and the corresponding kernel values in the second data stream are paired for kernel processing as described further below.

Step 1120 determines whether, for the current iteration, the pixel value read at step 1110 was the last pixel value in the current row of the primary image. Since the method receives the primary image as an input, the size of the image in terms of the number of rows and columns of pixels is known. Thus, if the value set in the image column counter at step 1112 is greater that the number of columns of pixels, then the pixel value read in the iteration was the last pixel in the image row, and the next pixel should be read from the next image row. If step 1120 determines that the pixel value read at step 1110 was not the last pixel value in the current image row, the method returns to step 1110, which reads the next pixel value in the current row (i.e. at the row and column position indicated by the image row and column counters). The method then continues in a loop through steps 1110, 1112 and 1120 until step 1120 determines that the pixel value read at step 1110 was the last pixel value in the current row. When step 1120 determines that the pixel value was the last pixel value in the current row, the method proceeds to step 1130. In addition, an indication of the determination may be output at "C" (e.g. an "end of image row" signal).

Step 1130 determines whether the current image row is the last row of pixels of the primary image. In particular, if the current value set in the image row counter is equal to the total number of rows of pixels of the primary image, then the current image row is the last row of pixels. If step 1130 determines that the current image row is not the last row pixels of the primary image, the method proceeds to step 1140 which increments the image row counter by 1. The method then returns to step 1108 which (re)sets the image column counter to 0. The method then continues with steps 1110 to 1120 by streaming pixels of the next image row until that 1130 determines that the current image row is the last row of pixels of the primary image. When step 1130 determines that the current image row is the last pixels of the primary image, the method ends at step 1195. At the same time, an indication of the determination may be output at "E" (e.g. an "end of image" signal). Accordingly, the first data stream formed by the method 1100 of FIG. 11 comprises a stream of pixel values of the pixels of the primary image read pixel-by-pixel and the line-by-line in raster scan order.

Step 1170 determines whether, for the current iteration, the kernel value read at step 1160 was the last kernel value in the current row of the kernel. Since the method receives the kernel as an input, its size in terms of the number of rows M and columns N of kernel values or weights is known. Thus, if the value set in the kernel column counter at step 1162 is greater that the number of columns N of kernel values, then the previous kernel value was the last kernel value in the row and the next kernel value should be read from the next row of the kernel. If step 1170 determines that the kernel value read at step 1160 was not the last kernel value in the current kernel row, the method returns to step 1160, which reads the next kernel value in the current row (i.e. at the row and column position indicated by the kernel row and column counters). The method then continues in a loop through 1160, 1162 and 1170 until step 1170 determines that the kernel value read at step 1160 was the last kernel value in the current row. When step 1170 determines that the kernel value was the last kernel value in the current row, the method proceeds to step 1180. In addition, an indication of the determination may be output at "B" (e.g. an "end of kernel row" signal).

Step 1180 determines whether, for the current iteration, the pixel value read at step 1110 was the last pixel value in the current row of the primary image. Step 1180 may be performed by determining whether an "end of image row" signal is output from step 1120 at "C", or may be a separate or joint operation with respect to step 1120. If step 1180 determines that the pixel value was not the last pixel value in the current row of the primary image, the method returns to step 1158 which (re)sets the kernel counter column to 0. As the skilled person will appreciate, this corresponds to moving to the next sampling position by displacement of the kernel by the stride in the x direction, which, in the illustrated example, is equal to the number of columns N of the kernel. The method then continues through steps 1160 to 1180 by repeatedly reading the kernel values in the current row in order until step 1180 determines that the end of the image row of the primary image has been reached (e.g. by receiving an "end of image row" signal). When step 1180 determines that the pixel value read at step 1110 was the last pixel value in the current row of the primary image, the method proceeds to step 1185.

Step 1185 determines whether the current kernel row is the last row of kernel values of the kernel. In particular, if the current value set in the kernel row counter is equal to the number of kernel rows M, then the current row is the last row of kernel values. If step 1185 determines that the current kernel row is not the last row of kernel values, the method proceeds to step 1190 which increments the kernel row counter by 1. The method then returns to step 1158 which (re)sets the kernel column counter to 0. The method then continues with steps 1160 to 1180 by repeatedly streaming kernel values of the next kernel row in order until that 1185 determines that the current kernel row is the last row of kernel values. When step 1185 determines that the current kernel row is the last row of kernel values, the method returns to step 1156 which (re)sets the kernel row counter to 0. As the skilled person will appreciate, this corresponds to moving to the next sampling position by displacement of the kernel by the stride in the y direction, which, in the illustrated example, is equal to the number of rows M of the kernel. At the same time, an indication of the determination may be output at "D" (e.g. an "end of kernel" signal). Accordingly, the second data stream formed by the method 1100 of FIG. 11 comprises a stream of kernel values or weights of the kernel read in order (and repeated for each sampling position) on a row-by-row basis. In particular, the kernel values of the second data stream are provided such that the kernel value at each position/point in time in the second data stream corresponds to, and so is paired/synchronised with, the pixel value of the pixel of the primary image in the first data stream.

As the skilled person will appreciate, various modifications may be made to the method of FIG. 11 to derive the synchronised first and second data streams for kernel subsampling of a primary image. For example, the method of FIG. 11 provides a stream of pixel values of the primary image in raster scan order, since the example kernel procedure has a stride in the x direction that is the same as the number of columns in the kernel (and a stride in the y direction that is the same as the number of rows in the kernel) in order to sample contiguous arrays of pixels of the primary image. However, in other examples, the stride in the x direction may be less than or greater than the number of columns in the kernel, in order to sample overlapping or separated arrays of pixels of the primary image in the x direction, respectively. Thus, in the case that stride in the x direction is less the number of columns in the kernel, each successive sampling window will overlap the preceding sampling window by one or more pixels. In this case, the pixel values that are overlapped may be repeated in the sequence of pixel values read from each row of the primary image to form the first data stream. Conversely, in the case that stride in the x direction is greater the number of columns in the kernel, each successive sampling window will be separated in the x direction from the preceding sampling window by one or more pixels. In this case, the pixel values in the space between the sampling windows may be omitted from the sequence of pixel values read from each row of the primary image to form the first data stream. In these examples, similar modifications may be required to modify the process of forming the second data stream of kernel values so that the correct corresponding kernel values are synchronised with the pixel values according to their position within the respective moving sampling window. Likewise, in other examples, the stride in the y direction may be less than or greater than the number of rows in the kernel, in order to sample overlapping or separated arrays of pixels of the primary image in the y direction, respectively. In these examples, pixel values of one or more rows of pixels of the primary image may be repeated in, or omitted from, the first data stream, and the corresponding kernel values synchronised in the second data stream, accordingly.

Kernel Operation and Buffering

As described herein, a process of sub-sampling a primary image to determine a secondary image may be performed by means of a kernel operation at a series of sampling positions. In accordance with the present disclosure, the kernel-based sub-sampling process is performed using data streaming, in order to reduce the storage and/or buffering capacity requirement.

Figure 7:
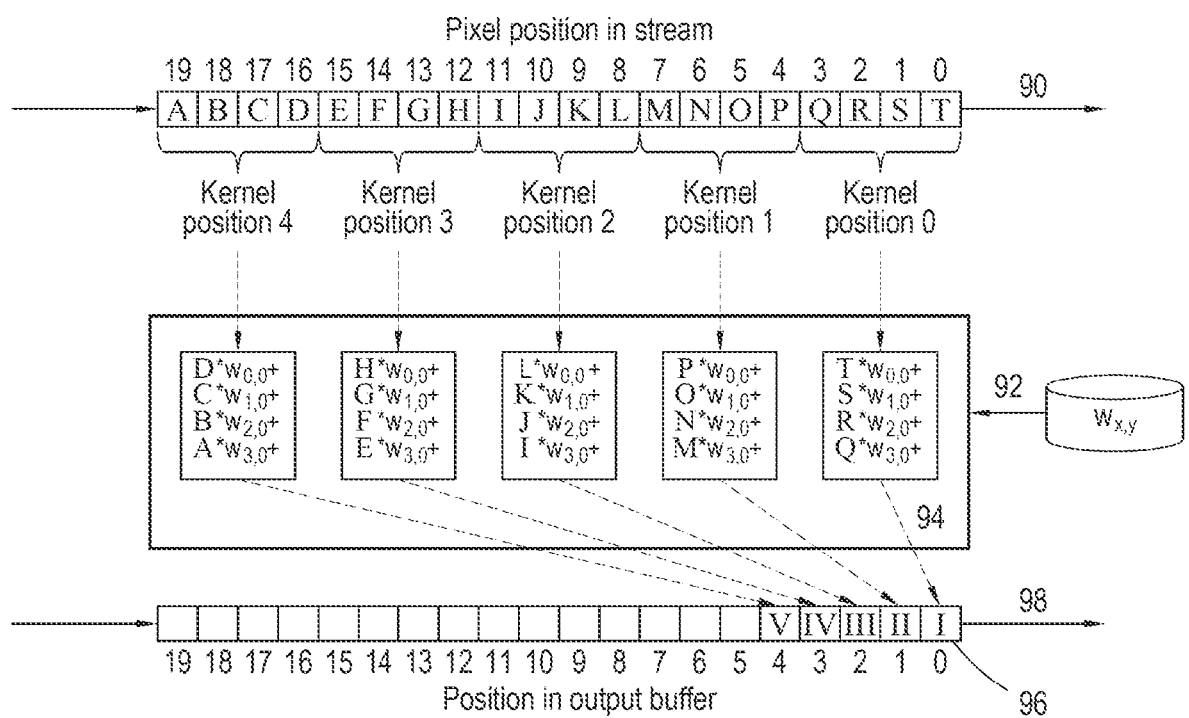
FIG. 7 shows the kernel sub-sampling procedure of FIG. 6 performed on the input data stream of image pixel data of a first row of the primary image and the output data stream of values provided to a buffer in accordance with embodiments.

FIG. 7 illustrates an example of a kernel sub-sampling procedure performed on a first data stream of pixel values of a first row of a primary image using the corresponding kernel values or weights of a second data stream, wherein the first and second data streams are formed as described above. FIG. 7 further shows the output data stream of accumulated values (so-called "partial pixel values") provided to a buffer. FIG. 7 may be referred to as a first iteration, since it performs kernel operations on a row of pixels of the primary image using the corresponding kernel values or weights of a first row of the kernel. Since the pixel values of the primary image are processed row by row, the processing of each row of image pixels may be regarded as an iteration.

In the example illustrated in FIG. 7, the kernel is a 4×4 array of kernel values, and the kernel is moved iteratively to a series of sampling positions so that contiguous 4×4 arrays of pixels of the primary image are contained within the sampling window. In particular, the stride in the x direction is 4 pixels and the stride in the y direction is 4 pixels. For ease of illustration, the primary image has 20 pixels in a row (i.e. 20 columns of pixels). As the skilled person will appreciate, in practice, the number of pixels of the primary image is significantly greater.

As shown in FIG. 7, first data stream 90 comprises an ordered sequence of 20 pixels values T, S, R, Q, P, O, N, M, L, K, J, I, H, G, F, E, D, C, B and A of the pixels of the first row (row 0) of the primary image at data entry positions 19, 18, 17, 16, 15, 14, 13, 12, 11,10, 9, 8, 7, 6, 5, 4, 3, 2, 1 and 0, respectively. In addition, second data stream 92 comprises an ordered sequence of 20 kernel values, wherein the kernel value at each data entry position in the second data stream corresponds to the pixel value at the same data entry position in the first data stream. As the skilled person will appreciate, the kernel values used to sample the pixels of the first row of image pixels correspond to a first row of kernel values of the kernel. As in the generic kernel of FIG. 5A, each kernel value is a weight denoted by the symbol $W_{x,y}$, where $(x,y)$ corresponds to the coordinate of the 4×4 array of kernel values or weights of the kernel.

Figure 8:
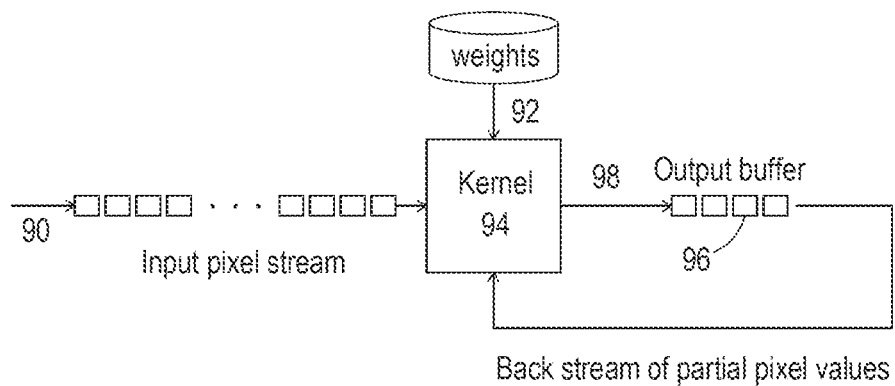
FIG. 8 schematically illustrates how the output data stream of values illustrated in FIG. 7 are used as partial pixel values that are provided as feedback to the kernel sub-sampling procedure in accordance with embodiments.

A base kernel procedure 94 receives each pixel value of first data stream 90 and the synchronised corresponding weight $W_{x,y}$ of the second data stream 92 and determines a corresponded weighted pixel value. In particular, the weighted pixel value is the product of the pixel value and the corresponding weight. The base kernel procedure 94 adds together the weighted pixel values for each kernel sampling position, in turn, to determine a corresponding (weighted) partial pixel value. Thus, the weighted pixel values for the first four pixel values of the first row of pixels in the first data stream, corresponding to the first sampling position (kernel position 0), are $T*W0, 0, S*W1, 0, R*W2, 0$ and $Q*W3, 0$. The sum of the four weighted pixel values at the first sampling position is denoted by the value I, which is written to a first position (buffer position 0) of an output buffer 96. As illustrated in FIG. 7, subsequently the base kernel procedure determines, in sequence, the weighted pixel values for each set of four pixel values of the first row of pixels in the first data stream, corresponding to the second to fifth sampling positions (kernel positions 1 to 4), respectively. The base kernel procedure 64 further determines the sum of each of the four weighted pixel values denoted as II, III, IV and V, which are written in sequence to second to fifth positions (buffer positions 1 to 4) of the output buffer, respectively. In some embodiments, the base kernel procedure 64 may implement a "Multiply Accumulate" or MAC procedure. For each pair of pixel and kernel values received from the first and second data streams, the procedure multiplies together the pixel value and weight to determine weighted pixel values, and accumulates the weighted pixel value by adding it to the sum of previously determined weighted pixel values for the same kernel sampling position. Thus, the accumulated sum based on four weighted pixel values (corresponding to the number of columns of the kernel and thus the "stride") is a partial (sub-sampled and weighted) pixel value for the corresponding kernel sampling position. These partial pixel values are stored in output buffer 96 and form a third data stream, which is provided as feedback to the kernel base procedure 94. FIG. 8 schematically illustrates the feedback of the partial pixel values of the third data stream 98, output from processing the first row of pixels of the primary image and stored sequentially in the output buffer 96 for each sampling position, to the base kernel procedure 94. The feedback of the third data stream 98 is provided concurrently with the first and second data streams 90, 92 so that the partial pixel values are synchronised with the pixel values of the next row of pixels of the primary image in the first data stream 90 and the corresponding kernel values in the second data stream 92.

Figure 9:
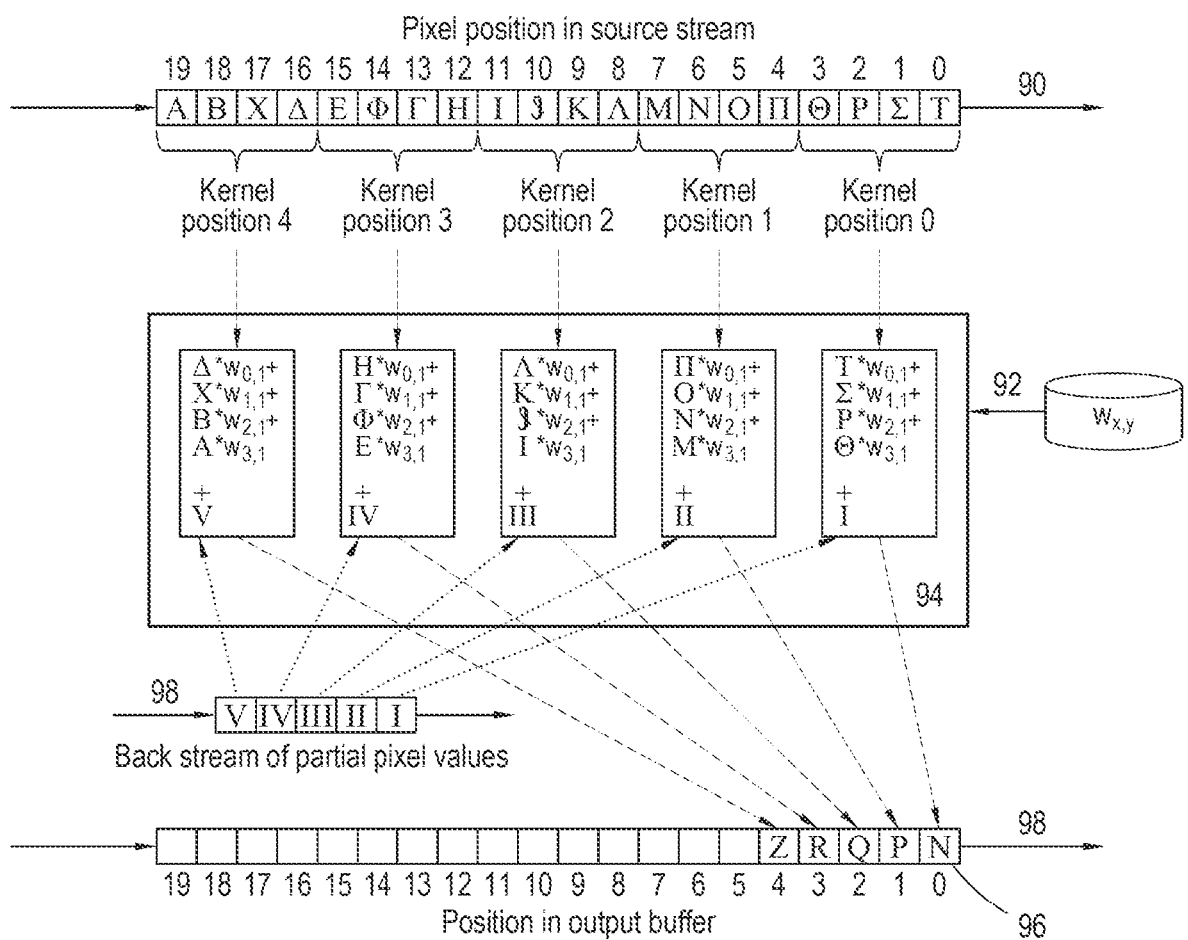
FIG. 9 shows the kernel sub-sampling procedure performed on the input data stream of image pixel data of a second row of the primary image, which receives the output data values of the procedure of FIG. 7 as feedback, and the output data stream of values provided to the buffer in accordance with embodiments.

FIG. 9 illustrates a second iteration of the example of a kernel sub-sampling procedure of FIG. 7. In FIG. 9, the procedure is performed on the first data stream of image pixel values of a second row of the primary image using the corresponding kernel values of the second row of the kernel of the second data stream. FIG. 9 further shows the use of the third data stream of partial pixel values, which were output from sub-sampling the pixels of the first row of the primary image in the first iteration, and provided as feedback from the output buffer. Finally, FIG. 9 shows the output data stream of updated partial pixel values provided in sequence to the output buffer.

As shown in FIG. 9, the first data stream 90 comprises an ordered sequence of 20 pixels values T, Σ, P, Θ, Π, O, N, M, Λ, K, θ, I, H, Γ, Φ, E, Δ, X, B and A of the pixels of the second row (row 1) of the primary image at data entry positions 19, 18, 17, 16, 15, 14, 13, 12, 11, 10, 9,8, 7, 6, 5, 4, 3, 2, 1 and 0, respectively. In addition, the second data stream 92 comprises an ordered sequence of 20 kernel values, wherein the kernel value at each data entry position in the second data stream corresponds to the pixel value at the same data entry position in the first data stream. As the skilled person will appreciate, the kernel values correspond to a next (second) row of the kernel.

The base kernel procedure 94 receives each pixel value of the second row of pixels of the primary image of the first data stream 90 and the synchronised corresponding weight $W_{x,y}$ of the second data stream 92 and determines a corresponded weighted pixel value. The base kernel procedure 94 adds together the weighted pixel values for each kernel sampling position, in turn, to determine a corresponding (weighted) partial pixel value. Thus, the weighted pixel values for the first four pixel values of the second row of pixels in the first data stream, corresponding to the first sampling position (kernel position 0), are T*W0, 1, Σ*W1, 1, P*W2, 1 and Θ*W3, 1. The sum of the four weighted pixel values at the first sampling position is added to the first partial pixel value of the third data stream 98 corresponding to the accumulated sum of weighted pixel values at the same sampling position. The updated accumulated sum of weighted pixel values is denoted by the value N, which is written to a first position (buffer position 0) of an output buffer 96. As illustrated in FIG. 9, subsequently the base kernel procedure determines, in sequence, the accumulated sums of weighted pixel values for each of the second to fifth sampling positions (kernel positions 1 to 4) in the same manner, which are written in sequence as partial pixel values P, Q, R, Z to second to fifth positions (buffer positions 1 to 4) of the output buffer, respectively.

As the skilled person will appreciate, the base kernel procedure 94 illustrated in FIG. 9 is repeated iteratively using the pixel values of the first data stream for each subsequent image row of the primary image using kernel values from the corresponding row of the kernel until the last kernel row. Once the pixel values corresponding to the kernel values of the last kernel row have been processed for a sampling position, then all the pixel values within the sampling window have been sampled and the accumulated value output to the buffer 96 represent the full (sum of the weighted) pixel value. Thus, when the base kernel procedure 94 determines that it is sub-sampling using the last kernel row, the output of the accumulated (weighted) pixel values is modified as described below with reference to FIG. 10.

Figure 10:
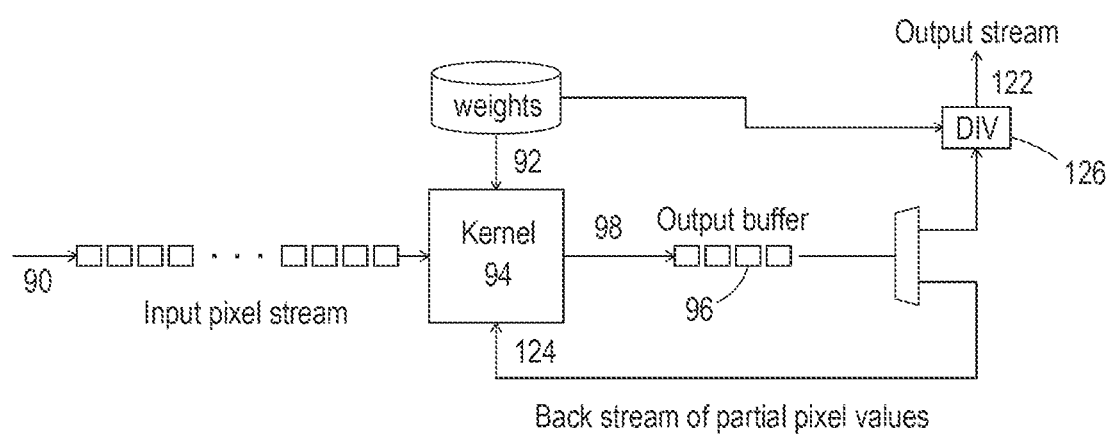
FIG. 10 shows the kernel sub-sampling procedure performed on the input data stream of image pixel data of a final row of the primary image, which receives the output data values of the procedure performed on the pixel values of the previous row of the primary image as feedback, and the output of stream of full (or complete) pixel values corresponding to the secondary image in accordance with embodiments.

FIG. 10 schematically illustrates the output of full or complete accumulated pixel values of a secondary image. This procedure may occur after each iteration using the kernel values of the last kernel row and/or after a final iteration. In particular, the full accumulated (weighted) pixel values are determined once all the pixel values of the pixels in a sampling window at a kernel sampling position have been sub-sampled. In particular, full accumulated pixel values are output by the base kernel procedure 94 when processing pixel values of an image row in the first data stream using a last row of kernel values of the kernel in the second data stream 92. As before, the accumulated (weighted) pixel values are sequentially provided to the output buffer 96 to form a third data stream 98. However, instead of providing the accumulated pixel values as feedback to the base kernel procedure 94, the third data stream 98 is fed to an optional division unit 126. Optional division unit 126 may determine the final sub-sampled pixel values for the secondary image by dividing each of the accumulated (weighted) pixel values of the third data stream 98 by the total kernel weight, to determine a normalised pixel value as described above. The output stream 122 from division unit may be streamed to data storage for the secondary image, and/or may be sent in real time to a hologram engine for hologram calculation. In addition, instead of feeding back the third data stream 98 to base kernel procedure 94, a back data stream 124 comprising a sequence of null data values (i.e. a sequence of zeros (0)) of the same number as the number of kernel positions for sub-sampling an image row, may be provided to the base kernel procedure 94. Back data stream 124 is provided concurrently with the first and second data streams 90, 92 so that the values at the corresponding positions in the respective data streams are synchronised. Although not illustrated in FIG. 7, a similar back data stream 124 may be provided to the base kernel procedure 94 for processing the pixel values corresponding to the first image row.

Figure 12:
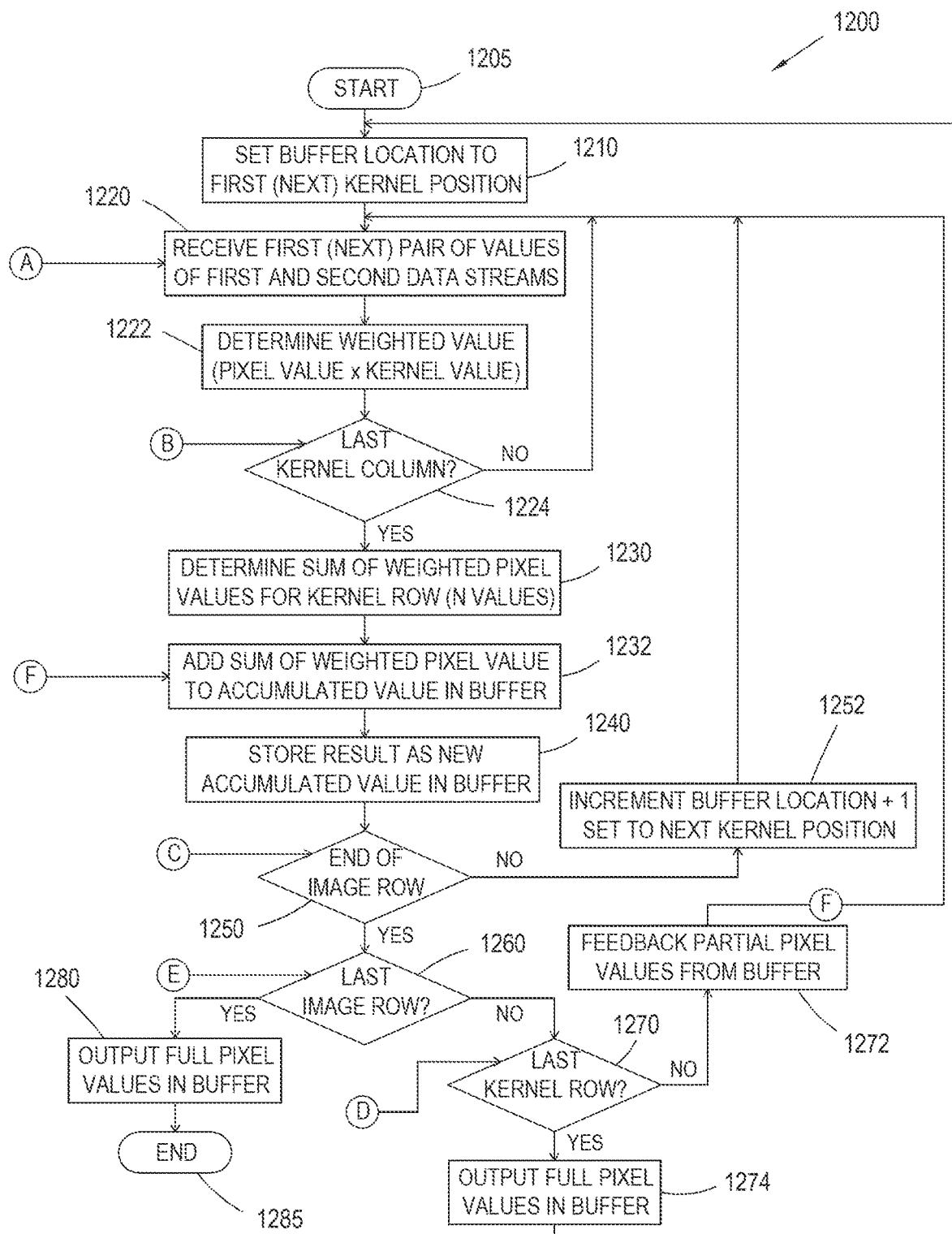
FIG. 12 shows a flowchart of a kernel operation and buffering procedure, comprising input values to a kernel sub-sampling procedure by means of data streams of pixels values and kernel values row-by-row, in which the output values of the sub-sampling procedure of each row are buffered as partial pixel values and provided as feedback to the sub-sampling procedure for the next row in accordance with embodiments.

FIG. 12 is a flowchart illustrates a method 1200 of kernel operation and buffering based on data streaming for sub-sampling a primary image in accordance with some embodiments. The method 1200 receives synchronized first and second data streams of pixel values and kernel values, respectively, and outputs a third data stream of partial (or full) pixel values to an output buffer for feedback (or output), as described above. The method 1200 may be implemented in combination with the method 1100 of data streaming of FIG. 11, as described above. In particular, certain steps of the method 1200 of FIG. 12 may receive output signals from steps of the method 1100 of FIG. 11. Accordingly, as in the method of FIG. 11, the kernel comprises an array of M rows and N columns of kernel values and thus forms a sampling window of an array of M×N pixels of the primary image. In addition, a series of sampling positions of the kernel are defined, in which the stride in the x direction is N pixels and the stride in the y direction is M pixels in order to sub-sample contiguous arrays of M×N pixels of the primary image.

The method of FIG. 12 sub-samples contiguous arrays of M×N pixels of the primary image using the kernel to generate pixel values of a secondary image of reduced resolution. In particular, a single pixel value of the secondary image is determined for each array of M×N pixels of the primary image contained within a sampling window defined by the kernel at a sampling position.

The method starts at step 1205 in response to receiving the first values of the first and second data streams or a related trigger indicating the start of the data streaming procedure. In some embodiments, step 1205 may additionally receive information about the primary image, in particular the number of rows and columns of image pixels and/or information about the kernel, in particular the number of row and columns of kernel value is provided in order to track the pixel and kernel values and the kernel sampling positions as described below.

Step 1210 sets the current storage location of the output buffer to the first kernel sampling position. It may be said that the first storage location in the output buffer is matched to the first sampling position of the kernel. As the skilled person will appreciate, the sampling positions for the kernel may be defined in ascending numerical order in increments of one (e.g. from kernel position 0 to kernel position X) according to the ordered sequence of sampling positions as the kernel moves over the primary image (e.g. in a raster scan path comprising strides in the x and y directions). As the skilled person will appreciate, in the illustrated embodiment, each storage location in the output buffer is dedicated to receive output (partial) pixel values relating to the corresponding sampling position.

Step 1220 receives the first pair of values of the synchronized first and second data streams. For example, the first and second data streams may be received from the output at "A" of the method 1100 of FIG. 11. Accordingly, step 1220 receives a first pixel value of the primary image from the first data stream and a corresponding first kernel value or weight of the kernel from the second data stream. As described above, the respective pairs of pixel and kernel values may be synchronised by a clock counter.

Step 1222 determines a corresponding weighted pixel value by multiplying the pixel value and the kernel value received in step 1220. Step 1224 then determines whether the weighted pixel value determined in step 1222 corresponds to the last pixel value of the image row at the current kernel sampling position. In particular, step 1224 may determine whether the processed pair of values of the first and second data streams correspond to the end of the kernel row (or the last kernel column). In the illustrated example, step 1224 determines that the weighted pixel value determined at step 1222 corresponds to the last pair of values for the current kernel sampling position if it receives an "end of kernel row" signal from "B" in the method 1100 of FIG. 11. In other examples, a kernel column counter may be used (e.g. set to zero before step 1220), in which case step 1224 may directly compare the value of the kernel column counter with the number of kernel columns. As the skilled person will appreciate, in the illustrated example, the kernel column counter is N when the kernel operates on the last pixel value of the current sampling position. If step 1224 determines that the weighted pixel value determined in 1222 is not the last pixel value of the current sampling position, the method returns to step 1220, which receives the next pair of pixel and kernel values of the first and second data streams. In examples that use a column kernel counter, the kernel counter is incremented by 1 before reading the next pair of value at step 1220. The method then continues in a loop comprising steps 1220 to 1224 until step 1224 determines that the previously determined weighted pixel value corresponds to last pair of pixel kernel values of the current sampling position and the method proceeds to step 1230.

Step 1230 determines the sum of the weighted pixel values for the current kernel position. In some embodiments, for a given kernel sampling position, each of the N weighted pixel values, which are determined sequentially by successive iterations of step 1224, is sent to a register (or other temporary data storage) via an adder. The adder adds the received weighted pixel value to the current value in the register, and returns the result to the register thereby updating the value held therein. Thus, in these embodiments, the N weighted pixel values determined for a particular kernel sampling position are added together in real time, and step 1230 determines the sum of the weighted pixel values as the final value stored in the register. In other embodiments, each weighted pixel value for a particular kernel sampling position may be stored in a register (or other temporary data storage) and added together in step 1230.

Step 1232 further adds the sum of the weighted pixel values for the current kernel position determined in step 1230 to the accumulated (partial pixel) value of the third data stream received from the output buffer as feedback. In the illustrated example, the third data stream of accumulated/partial pixel values may be received from "F", as described below. As described above, a stream of null partial pixel values may be provided as feedback when processing pixel values in a row corresponding to kernel values in the first row of the kernel. The value determined in step 1232 thus corresponds to an updated accumulated (partial pixel) value for the current kernel position.

Step 1240 stores the updated accumulated (partial pixel) value determined in step 1222 in the current storage location of the output buffer. The method then continues with step 1250.

Step 1250 determines whether the pixel value of the first data stream received in previous step 1220 corresponds to the pixel value of the last pixel in an image row of the primary image. In the illustrated example, step 1250 determines that a pixel value received in previous step 1220 is the last pixel in, and therefore at the end of, an image row of the primary image if it receives an "end of image row" signal from "C" of the method 1100 of FIG. 11. In other examples, the method 1200 may receive information about the number of pixel columns of the primary image and include an image column counter (not shown) to track the pixel values of the first data stream received at step 1220, in order to identify the end of an image row. If step 1250 determines that the pixel value received at previous step 1220 does not correspond to a last pixel in an image row, the method proceeds to step 1252 which increments the storage location of the output buffer by 1 and sets the new storage location to the next kernel sampling position, for example by incrementing the kernel sampling position by 1 (c.f. step 1210). The method then returns to step 1220, which receives the next pair of pixel and kernel values of the first and second data streams. Again, in examples that use a kernel column counter, the kernel column counter is reset to 0 prior to receiving the next pair of values at step 1220. The method then continues in an inner loop comprising steps 1220 to 1252 until step 1250 determines that the pixel value received in previous step 1220 is at the end of an image row. When step 1250 determines that the last received pixel value is at the end of an image row, the method proceeds to step 1260.

Step 1260 determines whether the image row of the pixel value received in previous step 1220 corresponds to the last image row of the primary image, and thus is the pixel value of the last pixel of the primary image in the first data stream. In the illustrated example, step 1260 determines that the pixel value received in previous step 1220 is the pixel value of the last pixel of the first data stream if it receives an "end of image" signal from "E" of the method 1100 of FIG. 11.

If step 1260 determines that pixel value received in previous step 1220 is not the pixel value of the last pixel in the first data stream, then sub-sampling of the primary image is not complete and the method proceeds to step 1270. On the other hand, if step 1260 determines that pixel value received in previous step 1220 is the pixel value of the last pixel in the first data stream, then sub-sampling of the primary image is complete and the method proceeds to step 1280, which outputs the last row of accumulated values of the third data stream from the output buffer as the full (or complete) pixel values of the (sub-sampled) secondary image. The method then ends at step 1285.

Returning to step 1270, the method 1200 determines whether the kernel value or weight of the second data stream received at step 1220 is from the last row of the kernel (i.e. is the last kernel value of the kernel), meaning that kernel sampling at the current sampling position is complete. In the illustrated example, step 1270 determines that the kernel value received in previous step 1220 is last kernel value of the kernel if it receives an "end of kernel" signal from "D" of the method 1100 of FIG. 11. In other examples, a kernel row counter is used to track the kernel rows, and step 1270 may directly compare the current value in the kernel row counter to the number of kernel rows M, and determine that the kernel value received in previous step 1220 is last kernel value of the kernel if there is a match. If step 1270 determines that the kernel value received in previous step 1220 is not the last kernel value of the kernel, the method continues with step 1272 which provides the current row of accumulated values stored in the output buffer as a third data stream of partial pixel values as feedback at "F", which is received, in turn, at step 1232 as described above. The method then returns to step 1220, which receives the next pair of pixel and kernel values of the first and second data streams. Again, in examples that use a kernel column counter, the kernel column counter is reset to 0 prior to receiving the next pair of values at step 1220. The method then continues in an outer loop comprising steps 1220 to 1272, which continues kernel sub-sampling for the same set of sampling positions (i.e. row of sampling positions) as the previous outer loop until step 1270 determines that the kernel value received in previous step 1220 is the last kernel value of the kernel and the method proceeds to step 1274.

When step 1270 determines that the kernel value received in previous step 1220 is the last kernel value of the kernel, two consequences arise. First, the sampling window of the kernel will be moved to the next sampling position by the stride distance in the y direction (i.e. next row of sampling positions) and to the start of the next image row in the x direction (since the pixel values in the first data stream are read from the primary image in raster scan order). Secondly, sub-sampling of the N pixel values contained within the kernel at each sampling position of a row of sampling positions have been processed by the kernel operation and so the accumulated values output to each corresponding storage location of the output buffer are full (or complete) pixel values for the secondary image.

Accordingly, step 1274 outputs the accumulated values stored in the output buffer as a third data stream comprising full (or complete) pixel values of the secondary image, for example to a divider 120 as illustrated in FIG. 10. This may serve to clear the storage locations of the output buffer. The method 1200 then returns to step 1210, which sets the current storage location in output buffer to the next kernel sampling position. Thus, the current first storage location in the output buffer is matched to the first sampling position of the next row of sampling positions of the kernel. The method 1200 then continues until step 1260 determines that the last image row has been processed, the last row of accumulated full (complete) pixel values of the (sub-sampled) secondary image is output in step 1280 and the method ends at step 1285.

As the skilled person will appreciate, the flowcharts illustrated in FIGS. 11 and 12 are by way of example only. Many variations or modifications are possible and contemplated when implementing the present disclosure. For example, the steps may be carried out in a different order from those depicted in the flowcharts.

Interlacing

As described above, a plurality of secondary images may be generated by sub-sampling (under-sampling) a primary image (either a source image or an intermediate image) using a kernel. Each secondary image comprises fewer pixels than the primary image. A hologram is determined for each of the plurality of secondary images, and each hologram is displayed, in turn, on a display device to form a holographic reconstruction corresponding to each secondary image on a replay plane.

Accordingly, there are disclosed herein techniques for interlacing a plurality of holographic reconstructions corresponding to a primary image, optionally, whilst compensating for warping by sub-sampling a warped version of the source image (i.e. an intermediate image).

In some embodiments, the speed of hologram calculation and interlacing is increased by means of the data streaming approach in accordance with the present disclosure. In particular, full or complete pixel values of the secondary image may be streamed to a hologram engine in real time to begin hologram calculation before all the pixel values of the secondary image have been determined. For example, the full or complete pixel values of each row of the secondary image output at step 1274 of the method 1200 of FIG. 12 may be streamed in real time to the hologram engine to begin hologram calculation, before the full or complete pixel values of the last row of the secondary image are output at step 1280.

Accordingly, there is disclosed herein a method for generating a secondary image by under-sampling a primary image using a kernel having m rows and n columns of kernel values, wherein the kernel has a plurality of kernel sampling positions for each row of the primary image, each kernel sampling position for a row separated by a stride distance of x pixels, the method comprising: forming a first data stream of pixel values, wherein the first data stream is formed by reading image pixel values of the primary image row-by-row; forming a second data stream of kernel values, and synchronizing the pixel values of the first data stream with the kernel values of the second data stream so that each pixel value is paired with a respective kernel value of the kernel for the corresponding kernel sampling position.

In some embodiments, there is provided a display device such as a head-up display comprising the holographic projector and an optical relay system. The optical relay system is arranged to form a virtual image of each holographic reconstruction. In some embodiments, the target image comprises near-field image content in a first region of the target image and far-field image content in a second region of the target image. A virtual image of the holographically reconstructed near-field content is formed a first virtual image distance from a viewing plane, e.g. eye-box, and a virtual image of the holographically reconstructed far-field content is formed a second virtual image distance from the viewing plane, wherein the second virtual image distance is greater than the first virtual image distance. In some embodiments, one hologram of the plurality of holograms corresponds to image content of the target image that will be displayed to a user in the near-field (e.g. speed information) and another hologram of the plurality of holograms corresponds to image content of the target image that will be projected into the far-field (e.g. landmark indicators or navigation indicators). The image content for the far-field may be refreshed more frequently than the image content for the near-field, or vice versa.

System Diagram

Figure 13:
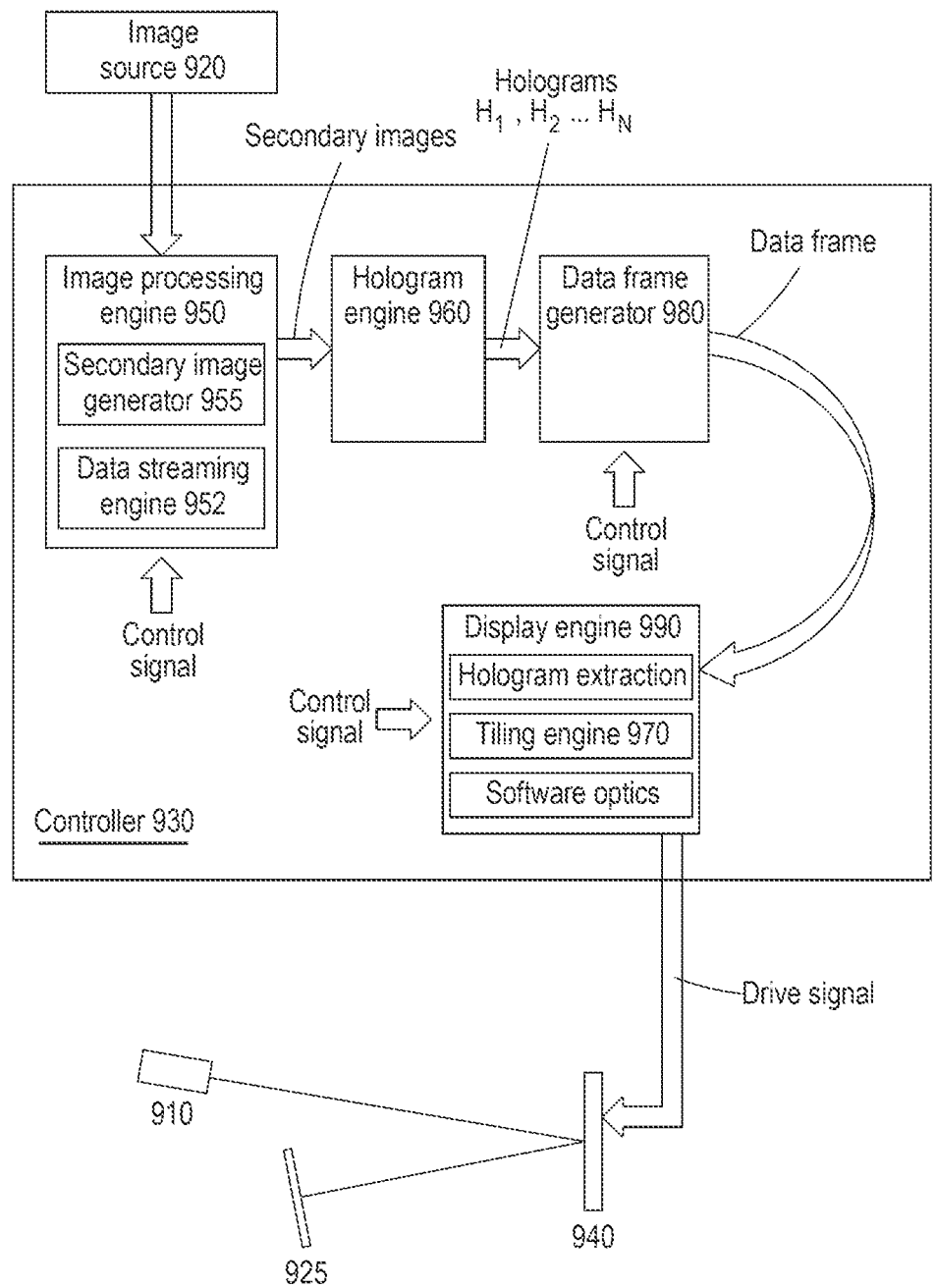
FIG. 13 is a schematic showing a holographic projector in accordance with embodiments.

FIG. 13 is a schematic showing a holographic system in accordance with embodiments. A spatial light modulator (SLM) 940 is arranged to display holograms received from a controller 930. In operation, a light source 910 illuminates the hologram displayed on SLM 940 and a holographic reconstruction is formed in a replay field on a replay plane 925. Controller 930 receives one or more images from an image source 920. For example, image source 920 may be an image capture device such as a still camera arranged to capture a single still image or video camera arranged to capture a video sequence of moving images.

Controller 930 comprises image processing engine 950, hologram engine 960, data frame generator 980 and display engine 990. Image processing engine 950 receives a target image from image source 920. Image processing engine 950 comprises a data streaming engine 952 arranged to receive the target image and the kernel, and to form corresponding synchronised data streams of pixel value and kernel value or weights as described herein. Image processing engine 950 includes a secondary image generator 955 arranged to generate a plurality of secondary images from a primary image based on the target image using the synchronised data streams from data streaming engine 950, as described herein. Image processing engine 950 may receive a control signal or otherwise determine the kernel scheme for generating the secondary images for use by data streaming engine 952. Thus, each secondary image comprises fewer pixels than the primary image. Image processing engine 950 may generate the plurality of secondary images using the source image as the primary image. The source image may be upscaled version of the target image, or the image processing engine may perform upscaling as described herein. Alternatively, image processing engine 950 may process the source image to determine an intermediate image, and use the intermediate image as the primary image. Image processing engine 950 may generate the plurality of secondary images by under-sampling the primary image, as described herein. Image processing engine 950 may determine a first secondary image and a second secondary image. Image processing engine 950 passes the plurality of secondary images to hologram engine 960. In some implementations, image processing engine 950 may stream pixel values of the secondary image to hologram engine 960 in real time as described herein.

Hologram engine 960 is arranged to determine a hologram corresponding to each secondary image, as described herein. Hologram engine 960 passes the plurality of holograms to data frame generator 980. Data frame generator 980 is arranged to generate a data frame (e.g. HDMI frame) comprising the plurality of holograms, as described herein. In particular, data frame generator 980 generates a data frame comprising hologram data for each of the plurality of holograms, and pointers indicating the start of each hologram. Data frame generator 980 passes the data frame to display engine 990. Data frame generator 980 and display engine 990, in turn, may operate by data streaming. Display engine 990 is arranged to display each of the plurality of holograms, in turn, on SLM 940. Display engine 990 comprises hologram extractor 992, tiling engine 970 and software optics 994. Display engine 990 extracts each hologram from the data frame using hologram extractor 992 and tiles the hologram according to a tiling scheme generated by tiling engine 970, as described herein. In particular, tiling engine 970 may receive a control signal to determine the tiling scheme, or may otherwise determine a tiling scheme for tiling based on the hologram. Display engine 990 may optionally add a phase ramp function (software grating function also called a software lens) using software optics 994, to translate the position of the replay field on the replay plane, as described herein. Accordingly, for each hologram, display engine 990 is arranged to output a drive signal to SLM 940 to display each hologram of the plurality of holograms, in turn, according to a corresponding tiling scheme, as described herein.

Controller 930 may dynamically control how secondary image generator 955 generates secondary images. Controller 930 may dynamically control the refresh rate for holograms. The refresh rate may be considered as the frequency at which a hologram is recalculated by hologram engine, from a next target image in a sequence received by image processing engine 950 from image source 920. As described herein, dynamically controllable features and parameters may be determined based on external factors indicated by a control signal. Controller 930 may receive control signals relating to such external factors, or may include modules for determining such external factors and generating such control signals, accordingly.

As the skilled person will appreciate, the above-described features of controller 930 may be implemented in software, firmware or hardware, and any combination thereof.

Accordingly, there is provided an image processing engine arranged to generate a secondary image by under-sampling a primary image using a kernel having m rows and n columns of kernel values, wherein the kernel has a plurality of kernel sampling positions for each row of the primary image, each kernel sampling position for a row separated by a stride distance of x pixels, wherein the image processing engine comprises a data streaming engine arranged to: form a first data stream of pixel values, wherein the first data stream is formed by reading image pixel values of the primary image row by row; form a second data stream of kernel values, and synchronise the pixel values of the first data stream with the kernel values of the second data stream so that each pixel value is paired with a respective kernel value of the kernel for the corresponding kernel sampling position.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose. The techniques for data streaming are applicable in all such applications.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes of data streaming described herein may be implemented in hardware in order to optimise processing speed. Nevertheless, the skilled person will appreciate that certain aspects of the data streaming techniques may also be implemented in software. Thus, aspects may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. An image processor arranged to generate a secondary image by under-sampling a primary image using a kernel having m rows and n columns of kernel values, wherein the kernel has a plurality of kernel sampling positions for each row of the primary image, each kernel sampling position for a row separated by a stride distance of x pixels, wherein the image processing engine comprises a data streaming engine configured to:
   form a first data stream of pixel values, wherein the first data stream is formed by reading image pixel values of the primary image row by row, each pixel value corresponding to a row position and a column position within the kernel;
   form a second data stream of kernel values, each kernel value corresponding to a row position and a column position within the kernel, and
   synchronise the pixel values of the first data stream with the kernel values of the second data stream so that each pixel value is paired with a respective kernel value corresponding to the same row position and column position within the kernel.

2. The image processor as claimed in claim 1 wherein there is a one-to-many correlation between the pixel values of the primary image in the first data stream and the kernel values of the second data stream.

3. The image processor as claimed in claim 1 wherein the data streaming engine is configured to form the second data stream using the steps:
   (i) repeatedly reading the kernel values of a first row of the kernel the plurality of times;
   (ii) repeatedly reading the kernel values of a next row of the kernel the plurality of times;
   (iii) iteratively repeating step (ii) (m-2) times;
   (iv) returning to step (i); and
   (v) stopping steps (i) to (iv) when there are no more pixel values in the first data stream.

4. The image processor as claimed in claim 1 wherein each row of kernel values of the kernel in the second data stream is paired with a plurality of rows of image pixels of the primary image in the first data stream.

5. The image processor as claimed in claim 1 further comprising a buffer, wherein the image processing engine is further configured to:
   receive, in sequence, synchronized pairs of image pixel values and kernel values of the first and second data streams from the data streaming engine;
   process each pixel value of the first data stream with its paired kernel value of the second data stream, and
   accumulate the processed pixel values for each kernel sampling position for storage in the buffer.

6. The image processor as claimed in claim 5 configured to:
   process the pixel values of a first row of the primary image in the first data stream using the steps:
      (a) multiplying each pixel value with its paired kernel value of the second data stream to determine a sequence of corresponding weighted pixel values,
      (b) summing the n weighted pixel values for each kernel sampling position of a first plurality of kernel sampling positions,
      (c) determining the accumulated weighted pixel values for each of the first plurality of kernel sampling positions, and
      (d) storing the accumulated weighted pixel values for each of the first plurality of kernel sampling positions in consecutive storage locations in the buffer so as to form a sequence of partial pixel values of a secondary image in the buffer, and
   iteratively repeat steps (a) to (d) to process the pixel values for each subsequent row of the primary image in the first data stream.

7. The image processor as claimed in claim 6 configured to:
   iteratively repeat steps (a) to (d) to process the pixel values of (m-1) subsequent rows of the primary image in the first data stream to determine an accumulated weighted complete pixel value for each of the first plurality of kernel sampling positions, and
   processing subsequent consecutive sets of m rows of pixel values of the primary image in the first data stream using steps (a) to (d) for each kernel sampling position of a further pluralities of kernel sampling positions.

8. The image processor as claimed in claim 6 further configured to process the pixel values of each row of the primary image in the first data stream using the step:
   (e) feeding-back, from the buffer, a third data stream comprising the sequence of partial pixel values of the secondary image for use in processing the pixel values of the next row of the primary image in the first data stream.

9. The image processor as claimed in claim 8 configured to determine the accumulated weighted pixel values for each kernel sampling position in (c) by determining the sum of:
   the n weighted pixel values determined in (b) for the kernel sampling position, and
   the corresponding partial secondary image pixel value of the third data stream for the kernel sampling position contained in the feedback in (e).

10. The image processor as claimed in claim 6 further configured to:
   (f) output from the buffer a final secondary image pixel value corresponding to each kernel sampling window position of each of the pluralities of kernel sampling window positions.

11. The image processor as claimed in claim 1 wherein the stride distance in the x direction is n pixels, and wherein the kernel is moved in a raster scan path in which the stride distance in the y direction is m pixels so that the kernel sampling sub-samples contiguous arrays of m×n pixels of the primary image.

12. A method for generating a secondary image by under-sampling a primary image using a kernel having m rows and n columns of kernel values, wherein the kernel has a plurality of kernel sampling positions for each row of the primary image, each kernel sampling position for a row separated by a stride distance of x pixels, the method comprising:

forming a first data stream of pixel values, wherein the first data stream is formed by reading image pixel values of the primary image row-by-row, each pixel value corresponding to a row position and a column position within the kernel;

forming a second data stream of kernel values, each kernel value corresponding to a row position and a column position within the kernel, and synchronizing the pixel values of the first data stream with the kernel values of the second data stream so that each pixel value is paired with a respective kernel value corresponding to the same row position and column position within the kernel.

13. The method as claimed in claim 12 wherein forming the second data stream comprises:
   (i) repeatedly reading the kernel values of a first row of the kernel the plurality of times;
   (ii) repeatedly reading the kernel values of a next row of the kernel the plurality of times;
   (iii) iteratively repeating step (ii) (m-2) times;
   (iv) returning to step (i), and
   (v) stopping steps (i) to (iv) when there are no more pixel values in the first data stream.

14. The method as claimed in claim 12 further comprising pairing each row of kernel values of the kernel in the second data stream with a plurality of rows of image pixels of the primary image in the first data stream.

15. The method as claimed in claim 12 further comprising:
   receiving, in sequence, synchronized pairs of image pixel values and kernel values of the first and second data streams from the data streaming engine;
   processing each pixel value of the first data stream with its paired kernel value of the second data stream;
   accumulating the processed pixel values for each kernel sampling position, and
   storing each of the accumulated values at a corresponding storage location in a buffer.

16. The method as claimed in claim 15 further comprising:
   processing the pixel values of a first row of the primary image in the first data stream using the steps:
   (a) multiplying each pixel value with its paired kernel value of the second data stream to determine a sequence of corresponding weighted pixel values,
   (b) summing the n weighted pixel values for each kernel sampling position of a first plurality of kernel sampling positions,
   (c) determining the accumulated weighted pixel values for each of the first plurality of kernel sampling positions, and
   (d) storing the accumulated weighted pixel values for each of the first plurality of kernel sampling positions in consecutive storage locations in the buffer so as to form a sequence of partial pixel values of a secondary image in the buffer, and
   iteratively repeating steps (a) to (d) to process the pixel values for each subsequent row of the primary image in the first data stream.

17. The method as claimed in claim 16 further comprising:
   iteratively repeating steps (a) to (d) to process the pixel values of (m-1) subsequent rows of the primary image in the first data stream to determine an accumulated weighted complete pixel value for each of the first plurality of kernel sampling positions, and
   processing subsequent consecutive sets of m rows of pixel values of the primary image in the first data stream using steps (a) to (d) for each kernel sampling position of a further pluralities of kernel sampling positions.

18. The method as claimed in claim 16 wherein processing the pixel values of each row of the primary image in the first data stream comprises:
   (e) feeding-back, from the buffer, a third data stream comprising the sequence of partial pixel values of the secondary image for use in processing the pixel values of the next row of the primary image in the first data stream.

19. The method as claimed in claim 18 wherein determining the accumulated weighted pixel values for each kernel sampling position in (c) comprises determining the sum of:
   the n weighted pixel values determined in (b) for the kernel sampling position, and
   the corresponding partial secondary image pixel value of the third data stream for the kernel sampling position contained in the feedback in (e).

20. The method as claimed in claim 16 further comprising:
   (e) outputting from the buffer a final secondary image pixel value corresponding to each sampling window position of each of the pluralities of sampling window positions.

21. The method as claimed in claim 12, wherein each kernel value is a weighting value.

* * * * *